US012497936B2

(12) United States Patent
Rogers et al.

(10) Patent No.: US 12,497,936 B2
(45) Date of Patent: Dec. 16, 2025

(54) APPARATUS AND PROCESS FOR COOLING PRESSURIZED GAS FOR FUELING

(71) Applicant: Air Products and Chemicals, Inc., Allentown, PA (US)

(72) Inventors: Harold James Rogers, Doylestown, PA (US); Joseph P. Cohen, Bethlehem, PA (US); Timothy J. Yurish, Bethlehem, PA (US); Richard Michael Fetcho, Coplay, PA (US); Chieh Liu, Bethlehem, PA (US); Brenden Thomas Sawadski, Pennsburg, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 129 days.

(21) Appl. No.: 18/513,731

(22) Filed: Nov. 20, 2023

(65) Prior Publication Data

US 2025/0163873 A1 May 22, 2025

(51) Int. Cl.
*F02M 31/00* (2006.01)

(52) U.S. Cl.
CPC ..... *F02M 31/005* (2013.01); *F02M 2200/248* (2013.01)

(58) Field of Classification Search
CPC ....................... F02M 31/005; F02M 2200/248
See application file for complete search history.

(56) References Cited

U.S. PATENT DOCUMENTS

| | | | |
|---|---|---|---|
| 6,745,801 | B1 | 6/2004 | Cohen et al. |
| 6,786,245 | B1 | 9/2004 | Eichelberger et al. |
| 7,028,724 | B2 | 4/2006 | Cohen et al. |
| 7,328,726 | B2 | 2/2008 | Cohen et al. |
| 7,793,675 | B2 | 9/2010 | Cohen et al. |
| 7,921,883 | B2 | 4/2011 | Cohen et al. |
| 8,020,589 | B2 | 9/2011 | Cohen et al. |
| 8,286,675 | B2 | 10/2012 | Farese et al. |
| 8,365,777 | B2 | 2/2013 | Farese et al. |
| 8,453,682 | B2 | 6/2013 | Bonner et al. |
| 8,899,278 | B2 | 12/2014 | Cohen et al. |
| 9,074,730 | B2 | 7/2015 | Cohen |
| 9,151,448 | B2 | 10/2015 | Cohen et al. |
| 9,261,238 | B2 | 2/2016 | Cohen et al. |
| 9,279,541 | B2 | 3/2016 | Cohen |
| 9,404,620 | B2 | 8/2016 | Cohen |
| 9,863,583 | B2 | 1/2018 | Youlio et al. |
| 10,502,649 | B1 | 12/2019 | Cohen |

(Continued)

FOREIGN PATENT DOCUMENTS

| | | | |
|---|---|---|---|
| CN | 110945277 A * | 3/2020 | ................ F17C 5/00 |
| DE | 102021004689 B3 | 1/2023 | |
| WO | 2023095604 A1 | 6/2023 | |

*Primary Examiner* — Lindsay M Low
*Assistant Examiner* — Charles J Brauch
(74) *Attorney, Agent, or Firm* — Matthew R. Weaver

(57) ABSTRACT

An apparatus and process for cooling a pressurized gas for feeding to one or more vehicle fuel tanks for fueling a vehicle can be configured so that a pressurized gas (e.g. hydrogen or natural gas) for fueling one or more vehicles can be cooled prior to dispensing via a heat transfer fluid that cools the pressurized gas and transfers the heat of the pressurized gas toward fluid of a heat sink source. The transfer of the heat to the heat sink source fluid can occur via a refrigerant in some embodiments.

15 Claims, 7 Drawing Sheets

(56) References Cited

U.S. PATENT DOCUMENTS

| | | | |
|---|---|---|---|
| 10,508,770 | B2 | 12/2019 | Cohen et al. |
| 11,167,732 | B1 | 11/2021 | Cohen et al. |
| 2014/0202585 | A1 | 7/2014 | Barker |
| 2020/0039811 | A1 | 2/2020 | Werlen et al. |
| 2020/0063917 | A1 | 2/2020 | Werlen et al. |
| 2023/0107342 | A1 | 4/2023 | Chalk et al. |
| 2023/0137335 | A1 | 5/2023 | Kyvelos et al. |
| 2023/0204159 | A1 | 6/2023 | Werlen et al. |
| 2023/0213147 | A1 | 7/2023 | Fairy et al. |

* cited by examiner

APPARATUS AND PROCESS FOR COOLING PRESSURIZED GAS FOR FUELING

FIELD OF THE INVENTION

The present innovation relates to processes, apparatuses, and systems for cooling a pressurized gas for feeding to one or more vehicle fuel tanks for fueling a vehicle. The fueling can also be considered refueling of the vehicle.

BACKGROUND OF THE INVENTION

Examples of hydrogen generation and/or supply systems can be appreciated from U.S. Pat. Nos. 6,401,767, 6,474,078, 6,619,336, 6,708,573, 6,745,801, 6,786,245, 7,028,724, 7,328,726, 7,793,675, 7,921,883, 8,020,589, 8,286,675, 8,365,777, 8,453,682, 8,899,278, 9,074,730, 9,151,448, 9,261,238, 9,279,541, 9,404,620, 9,863,583, 10,502,649, 10,508,770, and 11,167,732. Examples of hydrogen storage and/or dispensing systems can also be appreciated from U.S. Patent Application Publication Nos. 2023/0137335 and 2023/0107342 and International Publication No. WO 2023/095604. Such systems can provide hydrogen to vehicles for use as a fuel for the vehicles.

Natural gas based storage and dispensing systems can provide natural gas for fueling of vehicles that utilize natural gas as a fuel. U.S. Patent Application Publication No. 2014/0202585 discloses an example of such a system.

SUMMARY

We determined that fueling operations can often be complicated in situations where each gas stream to be fed to a vehicle fuel tank via a dispenser may be cooled by different heat exchangers using different cooling mediums or refrigerants. The different cooling processing can make fueling operations inefficient and relatively complex as multiple different cooling operations may need to be monitored and managed independently. We have found that this type of approach can result in relatively complicated process control that results in multiple variables being monitored and changed without sufficient regard to the overall cooling being provided, for example. This can result in inefficient processing decisions that results in wasted energy and other losses. These losses can result in decreased profit in operation and also result in lost energy and/or electricity from such inefficiencies.

We determined that a pressurized gas cooling apparatus for fueling can be provided that can help reduce such complexities and also allow for a more efficient overall process for cooling a pressurized gas for fueling (e.g. dispensing the pressurized gas to one or more vehicle fuel tanks for fueling). In some embodiments, a cold heat transfer fluid can be provided via a common refrigeration system that can allow heat transfer fluid to flow to one or more heat exchangers for cooling the pressurized gas as needed. A refrigerant can also be provided from a refrigerant source to provide cooling to the heat transfer fluid to facilitate transfer of the heat from the pressurized gas to a common heat sink for the cooling of the pressurized gas provided via the heat exchanger(s) and the heat transfer fluid in some embodiments. In other embodiments, fluid of the heat sink source can be used directly instead of the use of the refrigerant for cooling of the heat transfer fluid and providing the heat sink for the pressurized gas cooling.

In some embodiments, a Variable Frequency Drive (VFD) pump can be positioned to adjust flow of the heat transfer fluid. A variable speed control for the refrigeration system compressor or pump can also be provided to help maintain a desired pre-selected temperature of heat transfer fluid for the cooling of the pressurized gas as well in some embodiments. One or more valves can also be controlled for adjusting the flow of heat transfer fluid to one or more heat exchangers for cooling the pressurized gas and/or the heat transfer fluid to help facilitate temperature control for the pressurized gas and heat transfer fluid.

Embodiments can permit a straightforward control of pressurized gas cooling as well. For instance, the temperature of one or more of the heat exchangers used for cooling the pressurized gas (e.g. pressurized gas coolers or pressurized gas cooling devices), can be monitored. When the temperature of the pressurized gas cooling heat exchanger is too high, an associated heat transfer fluid valve to feed heat transfer fluid to that heat exchanger can be opened or opened further to allow a sufficient flow of cold heat transfer fluid to the pressurized gas cooling heat exchanger. This can allow for independent control of dispensed gas temperature to each vehicle being fueled within an acceptable range in a relatively straightforward manner that can permit process control complexity to be reduced in addition to permitting improved efficient operation.

In some embodiments, a variable speed controller for the heat transfer fluid pump can be adjusted to adjust the flow of heat transfer fluid based on the number of open valves and/or the open position of those valves to keep the flow of the heat transfer fluid through each heat exchanger consistent.

A temperature sensor can be positioned to measure the temperature of the heat transfer fluid returning from the one or more pressurized gas cooling heat exchangers and a variable speed compressor in the refrigeration system can be configured to utilize the temperature information from the temperature sensor to control the flow of a refrigerant that is provided for cooling the heat transfer fluid after it is warmed from cooling the pressurized gas and output from the pressurized gas cooling heat exchanger to maintain the temperature of the heat transfer fluid sent to the heat exchanger(s) to a pre-selected heat transfer fluid feed temperature for feeding the heat transfer fluid to the pressurized gas cooling heat exchanger for cooling of the pressurized gas. The refrigerant can be a heat sink fluid that can function as the ultimate heat sink for the heat of the pressurized gas that is cooled and the heat transfer fluid can function as the intermediary heat transfer fluid to facilitate the transfer of heat from the pressurized fluid to the refrigerant. The refrigerant can alternatively be provided in a refrigerant circuit to facilitate an exchange of the heat absorbed from the heat transfer fluid to a heat sink fluid from a heat sink source to facilitate the heat sink source fluid ultimately absorbing the heat from the pressurized gas that is cooled via the heat transfer fluid.

In a first aspect, an apparatus for cooling a pressurized gas for fueling is provided. Embodiment of the apparatus can include a first pressurized gas cooler positioned to receive a first stream of pressurized gas from a pressurized gas storage unit or compressor to cool the first stream of the pressurized gas to a pre-selected fueling temperature. The first pressurized gas cooler can be positioned to receive a first portion of heat transfer fluid from a heat transfer fluid storage unit for cooling of the first stream of the pressurized gas. The first pressurized gas cooler can be connected to an output conduit to output the first stream of the pressurized gas at the pre-selected fueling temperature for feeding to at least one vehicle for fueling of the at least one vehicle.

In some embodiments, the first pressurized gas cooler can be positioned to receive the first stream of pressurized gas from the pressurized gas storage unit. In other embodiments, the first pressurized gas cooler can be positioned to receive the first stream of pressurized gas from the compressor.

In a second aspect, the at least one vehicle can include a first vehicle. In some embodiments, the at least one vehicle can also include at least one other vehicle (e.g. a second vehicle, a third vehicle, a fourth vehicle, etc.). The output conduit can be connected to a first feed conduit to feed a first portion of the first stream of the pressurized gas to the first vehicle after the first stream of pressurized gas is cooled to the pre-selected fueling temperature. In some embodiments, the output conduit can be connected to a second feed conduit to feed a second portion of the first stream of the pressurized gas to a second vehicle after the first stream of pressurized gas is cooled to the pre-selected fueling temperature. The output conduit can be connected to a third feed conduit to feed a third portion of the first stream of the pressurized gas to a third vehicle after the first stream of pressurized gas is cooled to the pre-selected fueling temperature.

In yet other embodiments, there can be a first vehicle and at least one second vehicle (e.g. only one second vehicle, multiple second vehicles, etc.) and the output conduit can be connected to a first feed conduit to feed a first portion of the first stream of the pressurized gas to the first vehicle after the first stream of pressurized gas is cooled to the pre-selected fueling temperature and also connected to at least one second feed conduit to feed at least one second portion of the first stream of the pressurized gas to the at least one second vehicle after the first stream of pressurized gas is cooled to the pre-selected fueling temperature.

In a third aspect, the apparatus can also include a second pressurized gas cooler positioned to receive a second stream of pressurized gas from the pressurized gas storage unit or the compressor to cool the second stream of the pressurized gas to the pre-selected fueling temperature. The second pressurized gas cooler can be positioned to receive a second portion of heat transfer fluid from the heat transfer fluid storage unit for cooling of the second stream of the pressurized gas. The second pressurized gas cooler can be connected to an output conduit to output the second stream of the pressurized gas at the pre-selected fueling temperature for feeding to (i) at least one third vehicle for fueling of the at least one third vehicle or (ii) at least one second vehicle for fueling of the at least one second vehicle.

For instance, in embodiments where a first pressurized gas cooler can feed pressurized gas to at least a first vehicle and at least one second vehicle, the second pressurized gas cooler can be configured so that the output conduit to which the second pressurized gas cooler is connected can output the second stream of the pressurized gas at the pre-selected fueling temperature for feeding to at least one third vehicle for fueling of the at least one third vehicle.

As another example, in embodiments where a first pressurized gas cooler can feed pressurized gas to at least a first vehicle, the second pressurized gas cooler can be configured so that the output conduit to which the second pressurized gas cooler is connected can output the second stream of the pressurized gas at the pre-selected fueling temperature for feeding to at least one second vehicle for fueling of the at least one second vehicle.

In a fourth aspect, the apparatus can include elements for storage and supply of the heat transfer fluid. For instance, the apparatus can include the heat transfer fluid storage unit and a heat transfer fluid pump positioned between the heat transfer fluid storage unit and the first pressurized gas cooler for feeding the first portion of the heat transfer fluid to the first pressurized gas cooler. The heat transfer fluid storage unit can include one or more storage tanks or storage vessels for storage of the heat transfer fluid, for example.

In a fifth aspect, the apparatus can include elements that can facilitate cooling of the heat transfer fluid. For instance, in some embodiments, the apparatus can include the heat transfer fluid storage unit and a heat transfer fluid pump positioned between the heat transfer fluid storage unit and the first pressurized gas cooler for feeding the first portion of the heat transfer fluid to the first pressurized gas cooler. A heat transfer fluid cooler can be positioned to receive heat transfer fluid from the heat transfer fluid storage unit for cooling the heat transfer fluid. The heat transfer fluid cooler can be positioned to receive a refrigerant or a heat sink fluid from a heat sink source for cooling of the heat transfer fluid.

As another example, the apparatus can include a heat transfer fluid cooler positioned to receive heat transfer fluid from the heat transfer fluid storage unit for cooling the heat transfer fluid. The heat transfer fluid cooler can be positioned to receive a refrigerant as a cooling medium for cooling of the heat transfer fluid. An expansion valve can be positioned to receive the refrigerant to expand the refrigerant and reduce a temperature of the refrigerant before the refrigerant is fed to the heat transfer fluid cooler.

As yet another example, the apparatus can include a heat transfer fluid cooler positioned to receive heat transfer fluid from the heat transfer fluid storage unit for cooling the heat transfer fluid. The heat transfer fluid cooler can be positioned to receive a refrigerant as a cooling medium for cooling of the heat transfer fluid. A refrigerant cooler can be positioned to receive refrigerant output form the heat transfer fluid cooler as warmed refrigerant to cool the warmed refrigerant, the refrigerant cooler also positioned to receive heat sink fluid from a heat sink source as a cooling medium for cooling the warmed refrigerant. An expansion valve can be positioned to receive the refrigerant to expand the refrigerant and reduce a temperature of the refrigerant before the refrigerant is fed to the heat transfer fluid cooler. The expansion valve can be positioned between the refrigerant cooler and the heat transfer fluid cooler.

In a sixth aspect, the pressurized gas can be comprised of hydrogen or natural gas. For instance, the pressurized gas can be hydrogen gas for fueling of hydrogen fueled vehicles. As another example, the pressurized gas can be natural gas for fueling of natural gas powered vehicles.

In a seventh aspect, the apparatus of the first aspect can include one or more features of the second aspect, third aspect, fourth aspect, fifth aspect, and/or sixth aspect to provide other embodiments. It should therefore be appreciated that other embodiments of the apparatus can include other features. Examples of such features can be appreciated from the exemplary embodiments discussed herein.

For instance, an embodiment of the apparatus for cooling a pressurized gas for fueling can be provided to include a first pressurized gas cooler positioned to receive a first stream of pressurized gas from a pressurized gas storage unit or a compressor to cool the first stream of the pressurized gas to a pre-selected fueling temperature. The first pressurized gas cooler can be positioned to receive a first portion of heat transfer fluid from a heat transfer fluid storage unit for cooling of the first stream of the pressurized gas. The first pressurized gas cooler can be connected to an output conduit to output the first stream of the pressurized gas at the pre-selected fueling temperature for feeding to at least one first vehicle for fueling of the at least one first vehicle. A controller having a processor connected to a non-transitory memory can be communicatively connected to a temperature sensor of the first pressurized gas cooler to receive temperature data from the temperature sensor for adjusting a flow of the first portion of the heat transfer fluid to the first pressurized gas cooler.

In some configurations, the apparatus having the controller can also include a second pressurized gas cooler positioned to receive a second stream of pressurized gas from the pressurized gas storage unit or the compressor to cool the second stream of the pressurized gas to the pre-selected fueling temperature. The second pressurized gas cooler can be positioned to receive a second portion of heat transfer fluid from the heat transfer fluid storage unit for cooling of the second stream of the pressurized gas. The second pressurized gas cooler can be connected to an output conduit to output the second stream of the pressurized gas at the pre-selected fueling temperature for feeding to at least one second vehicle for fueling of the at least one second vehicle. The controller can be communicatively connected to a temperature sensor of the second pressurized gas cooler to receive temperature data from the temperature sensor for adjusting a flow of the second portion of the heat transfer fluid to the second pressurized gas cooler.

Some embodiments of such an apparatus having a controller can also include other features. For instance, the apparatus can include a heat transfer fluid storage unit and a heat transfer fluid pump positioned between the heat transfer fluid storage unit and the first pressurized gas cooler for receiving heat transfer fluid from the heat transfer fluid storage unit for feeding the first portion of the heat transfer fluid to the first pressurized gas cooler and the second portion of the heat transfer fluid to the second pressurized gas cooler. The controller can be communicatively connectable to the heat transfer fluid pump to adjust operation of the heat transfer fluid pump. A heat transfer fluid cooler can also be positioned to receive heat transfer fluid from the heat transfer fluid storage unit for cooling the heat transfer fluid. The heat transfer fluid cooler can be positioned to receive a refrigerant or a heat sink fluid from a heat sink source for cooling of the heat transfer fluid.

In an eighth aspect, a process for cooling a pressurized gas for fueling is provided. Embodiments of the process can be configured so that an embodiment of our apparatus can implement the process. Some embodiments of our process can include feeding heat transfer fluid to at least one pressurized gas cooling device to cool pressurized gas to a pre-selected temperature for feeding to at least one vehicle fuel tank, outputting the heat transfer fluid from the at least one pressurized gas cooling device after the heat transfer fluid is warmed via cooling of the pressurized gas for feeding the heat transfer fluid toward a heat transfer fluid cooler for cooling the heat transfer fluid, feeding a refrigerant or a heat sink fluid to the heat transfer fluid cooler to cool the heat transfer fluid to a pre-selected heat transfer fluid temperature, and adjusting a flow of the heat transfer fluid to the at least one pressurized gas cooling device based on a temperature of the pressurized gas output from the at least one pressurized gas cooling device for feeding to the at least one vehicle fuel tank.

In a ninth aspect, the process can be configured so that the feeding of the heat transfer fluid to the at least one pressurized gas cooling device to cool pressurized gas to the pre-selected temperature for feeding to the at least one vehicle fuel tank includes feeding a first portion of the heat transfer fluid to a first pressurized gas cooling device of the at least one pressurized gas cooling device. In some embodiments, the feeding of the heat transfer fluid to the at least one pressurized gas cooling device to cool pressurized gas to the pre-selected temperature for feeding to the at least one vehicle fuel tank can also include feeding a second portion of the heat transfer fluid to a second pressurized gas cooling device of the at least one pressurized gas cooling device.

In a tenth aspect, the adjusting of the flow of the heat transfer fluid to the at least one pressurized gas cooling device based on the temperature of the pressurized gas output from the at least one pressurized gas cooling device for feeding to the at least one vehicle fuel tank can include adjusting a flow rate of the heat transfer fluid based on temperature data from at least one temperature sensor of the at least one pressurized gas cooling device.

For example, the process can be configured so that the adjusting of the flow of the heat transfer fluid to the at least one pressurized gas cooling device based on the temperature of the pressurized gas output from the at least one pressurized gas cooling device for feeding to the at least one vehicle fuel tank includes adjusting a flow rate of the first portion of the heat transfer fluid based on temperature data from a temperature sensor of the first pressurized gas cooling device. In some embodiments, that may utilize a second portion of the heat transfer fluid that is feedable to a second pressurized gas cooling device, the adjusting of the flow of the heat transfer fluid to the at least one pressurized gas cooling device based on the temperature of the pressurized gas output from the at least one pressurized gas cooling device for feeding to the at least one vehicle fuel tank can also include adjusting a flow rate of the second portion of the heat transfer fluid based on temperature data from a temperature sensor of the second pressurized gas cooling device.

In an eleventh aspect, the process can also include adjusting a flow rate of the refrigerant or the heat sink fluid to the heat transfer fluid cooler. For example, some embodiments can include adjusting a flow rate of the refrigerant or the heat sink fluid to the heat transfer fluid cooler based on the temperature data from the at least one temperature sensor of the at least one pressurized gas cooling device and/or temperature data from a heat transfer fluid temperature sensor.

In a twelfth aspect, embodiments of the process can include adjusting a position of an expansion valve for expansion of the refrigerant and/or the heat sink fluid based on the temperature data from the at least one temperature sensor of the at least one pressurized gas cooling device and/or temperature data from a heat transfer fluid temperature sensor. For instance, some embodiments of the process can include adjusting a flow rate of the refrigerant or the heat sink fluid to the heat transfer fluid cooler and/or adjusting a position of an expansion valve for expansion of the refrigerant and/or the heat sink fluid based on the temperature data from the at least one temperature sensor of the at least one pressurized gas cooling device and/or temperature data from a heat transfer fluid temperature sensor.

In a thirteenth aspect, embodiments of the process can also include feeding a first stream of the pressurized gas to the first pressurized gas cooling device to cool the first stream of the pressurized gas to the pre-selected temperature for feeding to at least one first vehicle. In embodiments in which a second stream of pressurized gas can be fed to a second pressurized gas cooling device, embodiments of the process can also include feeding a second stream of the pressurized gas to the second pressurized gas cooling device to cool the second stream of the pressurized gas to the pre-selected temperature for feeding to at least one second vehicle.

In a fourteenth aspect, the process of the eighth aspect can include one or more features of the ninth aspect, tenth aspect, eleventh aspect, twelfth aspect and/or thirteenth aspect for provide other embodiments of the process. Embodiments of the process can therefore include yet other features. Examples of such features can be appreciated from the exemplary embodiments of the process discussed herein. For example, some embodiments of the process can be adapted such that the pressurized gas includes hydrogen or natural gas.

It should be appreciated that embodiments of the process and apparatus can utilize various conduit arrangements and process control elements. The embodiments may utilize sensors (e.g., pressure sensors, temperature sensors, flow rate sensors, concentration sensors, etc.), piping, controllers, valves, and other process control elements. Some embodiments can utilize an automated process control system and/or a distributed control system (DCS), for example. Various different conduit arrangements and process control systems can be utilized to meet a particular set of design criteria. The DCS or automated process control system can utilize one or more computer devices that include a processor connected to a non-transitory computer readable medium and at least one transceiver that is configured to monitor, oversee and/or control processing in accordance with at least one pre-defined algorithm that can be defined in code stored in the computer readable medium that is executable by the processor.

Other details, objects, and advantages of our process, apparatus, and system for cooling a pressurized gas for fueling, hydrogen fuel cooling apparatus for hydrogen fueling stations, natural gas fuel cooling apparatus for natural gas fueling stations, and methods of making and using the same will become apparent as the following description of certain exemplary embodiments thereof proceeds.

BRIEF DESCRIPTION OF THE DRAWINGS

Exemplary embodiments of our process, apparatus, and system for cooling a pressurized gas for fueling, and methods of making and using the same are shown in the drawings included herewith. It should be understood that like reference characters used in the drawings may identify like components.

FIG. 1 also illustrates an exemplary embodiment of our process for cooling a pressurized gas for fueling. Various optional elements that can be included in the exemplary embodiment illustrated in FIG. 1 are shown in broken line.

FIG. 2 also illustrates an exemplary embodiment of our process for cooling a pressurized gas for fueling.

FIG. 3 also illustrates an exemplary embodiment of our process for cooling a pressurized gas for fueling.

FIG. 4 also illustrates an exemplary embodiment of our process for cooling a pressurized gas for fueling.

FIG. 7 also illustrates an exemplary embodiment of our process for cooling a pressurized gas for fueling. Various optional elements that can be included in the exemplary embodiment illustrated in FIG. 7 are shown in broken line.

DETAILED DESCRIPTION

Figure 1:
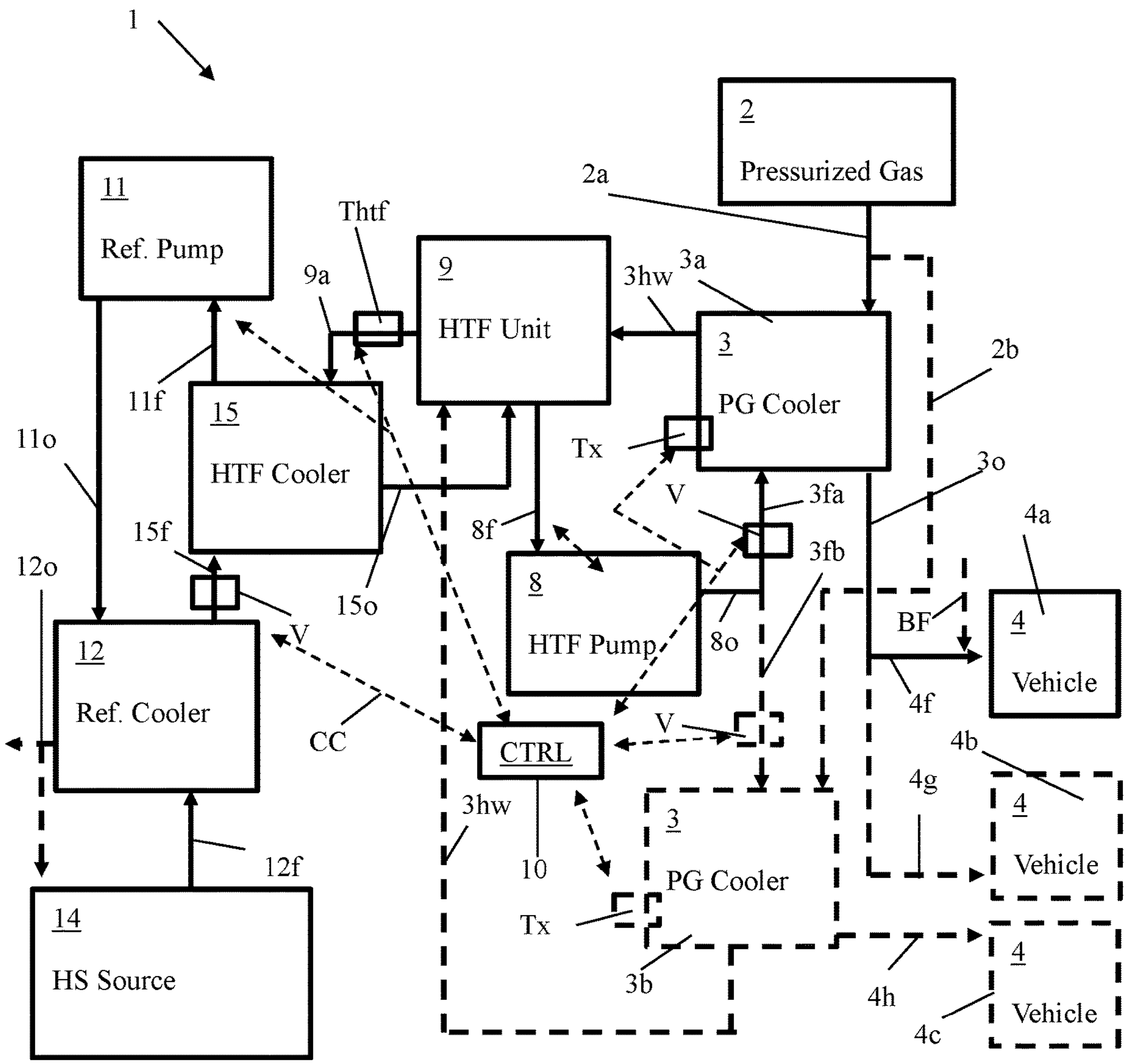
FIG. 1 is a block diagram of a first exemplary embodiment of an apparatus 1 for cooling a pressurized gas for fueling.

As may be appreciated from FIGS. 1-7 and the disclosure provided herein, exemplary embodiments of our apparatus 1 for cooling a pressurized gas for fueling can be positioned and arranged for improved fueling operation to facilitate feeding of a pressurized gas as a fuel to one or more vehicle fuel tanks. Embodiments can be adapted for use in hydrogen fueling stations or natural gas fueling stations, for example.

The apparatus 1 can include a pressurized gas storage unit or compressor to provide pressurized gas 2 (Pressurized Gas). The pressurized gas storage unit or compressor that provides the pressurized gas 2 can include at least one storage tank or vessel that can be positioned between a flow control manifold and a dispenser, can be positioned upstream of a dispenser for feeding the pressurized gas to the dispenser for feeding to a fuel tank of a vehicle 4, or can be integrated into a dispenser for feeding the pressurized gas from the dispenser to a fuel tank of a vehicle 4. In situations where the pressurized gas is output from a compressor for feeding to the dispenser 7 more directly (e.g. without one or more intermediate storage tanks or buffer tanks between the compressor and the dispenser, etc.), the pressurized gas compressor can be upstream of a flow control manifold and a dispenser or can be positioned upstream of a dispenser for feeding the pressurized gas to the dispenser for feeding to a fuel tank of a vehicle 4. The dispenser can utilize a hose and nozzle to facilitate connection with a vehicle fuel tank for feeding the pressurized gas to the fuel tank for fueling of the vehicle 4.

A pressurized gas storage unit that can provide the pressurized gas 2 can store the pressurized gas at a pre-selected storage pressure for providing the pressurized gas 2 to at least one pressurized gas cooler 3 for feeding to one or more vehicles 4. For example, the pre-selected storage pressure can be 35 MPa, 70 MPa, or between 30 MPa and 75 MPa for some embodiments. Other embodiments may utilize a different pre-selected storage pressure. In situations where the pressurized gas 2 is output more directly from a compressor, the compressor can output the pressurized gas at a pre-selected feed pressure (e.g. between 30 MPa and 75 MP or between 0.5 MPa and 100 MPa, etc.) for feeding to one or more pressurized gas coolers 3 for outputting the cooled pressurized gas for feeding to one or more vehicles 4.

The pressurized gas that is stored in the pressurized gas storage unit or output from the compressor as the pressurized gas 2 can be hydrogen or natural gas in some embodiments. For example, the pressurized gas can be a hydrogen gas that is at least 99 mole percent (mol %) hydrogen gas (H2) or is between 98 mol % H2 and 100 mol % H2. As another example, the pressurized gas can be natural gas that is at least 99 mol % methane (CH4) or is between 95 mol % CH4 and 100 mol % CH4.

At least one vehicle 4 can receive pressurized gas 2 from the pressurized gas storage unit or compressor for filling a fuel tank of each vehicle 4. In some embodiments, a first vehicle 4*a* can receive the pressurized gas for fueling. In other embodiments, a first vehicle 4*a* and a second vehicle 4*b* can receive the pressurized gas for fueling at the same time from different dispensers. In yet other embodiments, more than two vehicles 4 can receive the pressurized gas. For example, a first vehicle 4*a*, second vehicle 4*b*, and third vehicle 4*c* can receive pressurized gas 2 for fueling from the pressurized gas storage unit or compressor.

Before the pressurized gas 2 output from the pressurized gas storage unit or compressor is fed to one or more vehicles, the pressurized gas can undergo cooling via at least one pressurized gas cooler 3 (PG Cooler). Each pressurized gas cooler 3 can be configured to cool the pressurized gas to a pre-selected fueling temperature for feeding the gas to a vehicle fuel tank. The pre-selected fueling temperature can be, for example, less than or equal to −33° C., less than or equal to −17° C., or other suitable fueling temperature within a pre-selected fueling temperature range (e.g. between −30° C. and −35° C., between −17° C. and −40° C., etc.). Each pressurized gas cooler 3 can be positioned in a dispenser or be in fluid communication with a dispenser for receiving the pressurized gas for cooling the gas prior to the dispenser distributing the gas to a vehicle (e.g. via a nozzle connected to the dispenser via a hose connected between the nozzle and the dispenser, etc.).

For example, pressurized gas 2 can be output from the pressurized gas storage unit or compressor via a first output conduit 2*a* connected between a first pressurized gas cooler 3*a* and a first dispenser for feeding fuel to a first vehicle 4*a*. The pressurized gas can be cooled via a heat transfer fluid fed to the first pressurized gas cooler 3*a* as a cooling medium therein for cooling the pressurized gas to the pre-selected fueling temperature. The cooled pressurized gas can be output from the first pressurized gas cooler 3*a* for feeding to the first vehicle 4*a* via a first pressurized gas cooler output conduit 30. The first pressurized gas cooler output conduit 30 can be connected to a first feed conduit 4*f* for feeding a first portion of the cooled pressurized gas to a first vehicle 4*a*. In situations where the cooled pressurized gas is to be fed toward multiple different vehicles, the first pressurized gas cooler output conduit 30 can also be connected to a second feed conduit 4*g* for feeding a second portion of the cooled pressurized gas to a second vehicle 4*b*. There can be additional feed conduits for feeding other portions of cooled pressurized gas to other vehicles as well in some embodiments (e.g. at least one third feed conduit connected to the first pressurized gas cooler output conduit 30 for feeding at least one third portion of the pressurized gas to at least one third vehicle). Each vehicle can receive the pressurized gas portion fed to that vehicle via a respective dispenser that can be connected between the vehicle and a respective feed conduit.

For instance, the first feed conduit 4*f* can be connected to a first dispenser or be integrated into a first dispenser for feeding the first portion of the pressurized gas to the first vehicle 4*a*. The second feed conduit 4*g* can be connected to a second dispenser or be integrated into a second dispenser for feeding the second portion of the pressurized gas to the second vehicle 4*b*. At least one third feed conduit can be connected to at least one third dispenser or be integrated into at least one third dispenser for feeding at least one third portion of the pressurized gas to a third vehicle 4*a* as well.

The heat transfer fluid fed to the first pressurized gas cooler 3*a* can be output as a warmed heat transfer fluid via a heat transfer fluid output conduit 3*hw* connected between the first pressurized gas cooler 3*a* and a heat transfer fluid storage unit 9 (HTF Unit). The heat transfer fluid storage unit 9 can include one or more storage vessels or tanks for storage of heat transfer fluid at a pre-selected storage pressure for storage and providing of sufficient heat transfer fluid to the one or more pressurized gas coolers 3 of the apparatus 1.

The heat transfer fluid that is stored in the heat transfer fluid storage unit 9 can be output from the heat transfer fluid storage unit 9 and fed to a heat transfer fluid cooler 15 (HTF Cooler) via a heat transfer fluid output conduit 9*a* connected between the heat transfer fluid storage unit 9 and the heat transfer fluid cooler 15 for cooling the heat transfer fluid to maintain the heat transfer fluid at a desired temperature for cooling of the pressurized gas. The cooled heat transfer fluid can be output form the heat transfer fluid 15 and fed to the heat transfer fluid storage unit 9 via a cooled heat transfer fluid feed conduit 150 connected between the heat transfer fluid cooler 15 and the heat transfer fluid storage unit 9.

A refrigerant can be fed to the heat transfer fluid cooler 15 for cooling the heat transfer fluid to a pre-selected heat transfer fluid temperature that can be selected for cooling the pressurized gas to the pre-selected fueling temperature within the pre-selected fueling temperature range. The refrigerant utilized for cooling the heat transfer fluid can be any suitable refrigerant for cooling the heat transfer fluid. The refrigerant fed to the heat transfer fluid cooler 15 can undergo cooling before it is fed to the heat transfer fluid cooler 15 via a refrigerant cooler 12 (Ref. Cooler) positioned between a refrigerant pump 11 (Ref. Pump) and the heat transfer fluid cooler 15. For instance, refrigerant output from a refrigerant pump 11 can be fed to the refrigerant cooler 12 via a refrigerant cooler feed conduit 110 connected between the refrigerant pump 11 and the refrigerant cooler 12. The cooled refrigerant can be output from the refrigerant cooler 12 for feeding to the heat transfer fluid cooler 15 at a pre-selected refrigerant feed temperature via a heat transfer fluid cooler feed conduit 15*f* positioned between the refrigerant cooler 12 and the heat transfer fluid cooler 15.

The refrigerant cooler 12 can receive a cooling medium that can function as the heat sink for the cooling of the pressurized gas from a heat sink source 14 (HS Source). The heat sink source 14 can be a suitable process gas or other source of cold fluid that can function as the ultimate heat sink for removal of the heat of the pressurized gas effected via the heat transfer fluid for cooling of the pressurized gas to the pre-selected fueling temperature.

The heat sink source 14 can be, for example, hydrogen gas or natural gas that is at a cryogenic temperature or near a cryogenic temperature that can be output from a liquid hydrogen gas or liquid natural gas storage tank for use as the refrigerant prior to venting that gas. For instance, gas from a pressurized storage tank for storing a cryogenic liquid can be output to maintain the pressure of the storage tank at or below a desired storage pressure. That output gas can be used as the heat sink fluid fed to the refrigerant cooler 12 for cooling the refrigerant prior to venting of that gas or feeding that gas to another element of the apparatus (e.g. a buffer tank for storing gas prior to other use of that gas, etc.).

The heat sink source can alternatively (or additionally) be another fluid from another process element. As another example, the heat sink source can be cryogenic fluid that is pressurized and output from a compressor. For example, a cryogenic fluid from a storage tank can be fed to a compressor to pre-cool the compressor for use and/or be output at a pre-selected pressure for feeding toward a dispenser. The fluid output from the compressor can be utilized as the heat sink source to help heat that fluid for feeding toward a dispenser (e.g. upstream of a buffer tank or flow control manifold).

The warmed heat sink gas can be output from the refrigerant cooler 12 via a warmed heat sink fluid conduit 120 connected to the refrigerant cooler 12. This conduit can be used for venting of that fluid or feeding the warmed heat sink fluid to another plant element or apparatus element.

In other embodiments, the heat sink source 14 can be the cooling medium utilized by the refrigerant cooler 12. For example, the refrigerant cooler can be an electric chiller or an adsorption chiller in some embodiments and the heat sink source may be the cooling medium utilized in that chiller for cooling the heat transfer fluid refrigerant used to cool the heat transfer fluid.

Warmed refrigerant used as the cooling medium for cooling the heat transfer fluid can be output from the heat transfer fluid cooler 15 for feeding to the refrigerant pump 11 via a refrigerant pump feed conduit **11*f* positioned between the heat transfer fluid cooler 15 and the refrigerant pump 11. The refrigerant pump 11 can increase the pressure of the refrigerant for feeding to the refrigerant cooler 12 and subsequently back to the heat transfer fluid cooler 15** for a heat transfer fluid refrigerant cooling circuit. A refrigerant buffer tank (not shown) can also be connected to this circuit for feeding refrigerant as may be needed to account for refrigerant makeup that may be needed as the refrigerant circuit is utilized for cooling of the heat transfer fluid.

In some embodiments, a valve V can be included in the heat transfer fluid cooler feed conduit **15*f* between the refrigerant cooler 12 and the heat transfer fluid cooler 15. The valve V of the heat transfer fluid cooler feed conduit 15*f*** can be an expansion valve configured to reduce the pressure of the refrigerant to a heat transfer fluid cooler feed pressure. The pressure reduction can further cool the refrigerant to the desired pre-selected refrigerant feed temperature.

The heat transfer fluid stored in the heat transfer fluid storage unit 9 can be maintained at a desired temperature via the heat transfer cooling circuit that utilizes the refrigerant for cooling of the heat transfer fluid. This can allow the heat transfer fluid to be provided to one or more of the pressurized gas coolers 3 from a centralized source to permit temperature control of the pressurized gas to be monitored and managed in an efficient manner that can also allow monitoring and management of the cooling of the pressurized gas to occur more simply and efficiently.

The heat transfer fluid can be output from the heat transfer fluid storage unit 9 and fed to the one or more pressurized gas coolers 3 via a heat transfer fluid pump 8 (HTF pump) positioned between the one or more pressurized gas coolers 3 and the heat transfer fluid storage unit 9. The heat transfer fluid can be fed from the heat transfer fluid storage unit 9 to the heat transfer fluid pump 8 via a heat transfer fluid pump feed conduit **8*f* connected between the heat transfer fluid storage unit 9 and the heat transfer fluid pump 8. The heat transfer fluid pump 8 can output the heat transfer fluid at a suitable pressurized gas cooler feed pressure for feeding to the at least one pressurized gas cooler 3 via a heat transfer fluid pump output conduit 80 connected between the one or more pressurized gas coolers 3 and the heat transfer fluid pump 8. Examples of a suitable pressurized gas cooler feed pressure can include a pressure of between 35 MPa and 70 MPa, between 0.5 MPa and 100 MPa, or other suitable pressure. For example, when the fuel to be cooled is hydrogen, the pre-selected pressurized gas cooler feed pressure for the heat transfer fluid can be between 20 MPa and 100 MPa. For other types of fuel, the pressure can within a different pre-selected range (e.g. use of one or more pressurized gas coolers 3** for natural gas cooling can utilize a different pressure range).

For example, a first portion of the heat transfer fluid output from the heat transfer fluid pump 8 can be fed to the first pressurized gas cooler **3*a* for functioning as the cooling medium therein for cooling the pressurized gas via a first heat transfer fluid feed conduit 3*fa* connected between the heat transfer fluid pump output conduit 80 and the first pressurized gas cooler 3*a*. A first portion of the cooled pressurized gas output from the first pressurized gas cooler 3*a* can be fed to a first vehicle 4*a* for fueling via the first feed conduit 4*f* as discussed above. A second portion of the cooled pressurized gas output from the first pressurized gas cooler 3*a* can be fed to a second vehicle 4*b* for fueling via the second feed conduit 4*g* as discussed above as well for embodiments where the first pressurized gas cooler 3*a*** is to cool pressurized gas for feeding to multiple different vehicles at different dispensers.

Additionally, a second portion of the heat transfer fluid output from the heat transfer fluid pump 8 can be fed to a second pressurized gas cooler **3*b* for functioning as the cooling medium therein for cooling another stream of pressurized gas 2 output from the pressurized gas storage unit or compressor via a second heat transfer fluid feed conduit 3*fb* connected between the heat transfer fluid pump output conduit 80 and the second pressurized gas cooler 3*b*. The pressurized gas to be cooled via the second pressurized gas cooler 3*b* can be fed to the second pressurized gas cooler 3*b* via a second output conduit 2*b* connected between the second pressurized gas cooler 3*b* and the pressurized gas storage unit or compressor providing the pressurized gas 2. The second output conduit 2*bt* can be positioned between the pressurized gas storage unit or compressor and the second pressurized gas cooler 3*b*. This second output conduit 2*b* can be a separate conduit or can be connected to the first output conduit 2*a* so that a first portion of the pressurized gas 2 output from the pressurized gas storage unit or compressor is fed to the first pressurized gas cooler 3*a* as a first stream of pressurized gas and a second portion of the pressurized gas 2 output from the pressurized gas storage unit or compressor is fed to the second pressurized gas cooler 3*b*** as a second stream of the pressurized gas.

A first portion of the cooled pressurized gas output from the second pressurized gas cooler **3*b* can be fed to another vehicle for fueling via a cooled pressurized gas output conduit 4*h* connected between the second pressurized gas cooler 3*b*** and the other vehicle.

In embodiments where the first pressurized gas cooler **3*a* may only supply cooled pressurized gas to a first vehicle 4*a*, the other vehicle that received cooled pressurized gas from the second pressurized gas cooler 3*b* can be considered a second vehicle. In other embodiments where the first pressurized gas cooler 3*a* can supply cooled pressurized gas to a first vehicle 4*a* and a second vehicle 4*b*, the other vehicle that receives cooled pressurized gas from the second pressurized gas cooler can be considered a third vehicle 4*c***.

A controller CTRL can be provided to help control the flow rate of the heat transfer fluid fed to one or more pressurized gas coolers 3 for cooling of the pressurized gas to the pre-selected fueling temperature. The controller CTRL can have communicative connections CC with valves, temperature sensors, pumps and other elements to provide such control for monitoring and/or managing the flow of heat transfer fluid to the pressurized gas cooler(s).

For example, the controller 10 can be communicatively connected to a pressurized gas cooler temperature sensor Tx for each pressurized gas cooler 3 to monitor a temperature of the pressurized gas cooler 3 or the temperature of the pressurized gas output from the pressurized cooler 3. In some embodiments, the temperature of the pressurized gas cooler 3 can be utilized for monitoring the temperature of the pressurized gas output from the cooler, for example. The temperature data can be fed from the temperature sensor Tx to the controller CTRL so that the controller can adjust a flow rate of heat transfer fluid to the pressurized gas cooler(s) 3 based on the temperature data to help ensure that the cooled pressurized gas output from the pressurized gas cooler(s) 3 is output at a suitable temperature (e.g. the pre-selected fueling temperature).

For example, in response to detecting that the temperature of the first pressurized gas cooler 3*a* is above a pre-selected threshold based on the temperature data received from the temperature sensor Tx, the controller 10 can communicate with the heat transfer fluid pump 8 and/or at least one valve V connected to the heat transfer pump output conduit 80 for adjusting a flow rate of heat transfer fluid to the pressurized gas cooler(s) for further cooling of the pressurized gas. For example, a first valve V1 connected to the first heat transfer fluid feed conduit 3*fa* can be further opened or adjusted from a closed position to an open position for feeding of heat transfer fluid or increasing the rate of heat transfer fluid fed to the first pressurized gas cooler 3*a* to provide additional cooling to the pressurized gas for cooling the gas to the pre-selected fueling temperature.

As another example, in response to detecting that the temperature detected by the temperature sensor Tx of the second pressurized gas cooler 3*b* is above a pre-selected threshold, the controller CTRL can communicate with the heat transfer fluid pump 8 and/or at least one valve V connected to the heat transfer pump output conduit 80 for adjusting a flow rate of heat transfer fluid to the pressurized gas cooler(s) for further cooling of the pressurized gas. For example, a second valve V2 connected to the second heat transfer fluid feed conduit 3*fb* can be further opened or adjusted from a closed position to an open position for feeding of heat transfer fluid or increasing the rate of heat transfer fluid fed to the second pressurized gas cooler 3*b* to provide additional cooling to the pressurized gas for cooling the gas to the pre-selected fueling temperature.

In addition, the controller CTRL can communicate with the valve V of the heat transfer fluid cooler feed conduit 15*f* and/or the refrigerant pump 11 to adjust operation of the heat transfer fluid cooler 15 for further cooling of the heat transfer fluid stored in the heat transfer fluid storage unit 9. The controller CTRL can also receive heat transfer fluid temperature data from a heat transfer fluid temperature sensor Thtf positioned for monitoring the temperature of the heat transfer fluid stored in the heat transfer fluid storage unit 9 to adjust cooling provided via the heat transfer fluid cooler 15 to provide increased cooling when the heat transfer fluid temperature is above a pre-selected high threshold and provide reduced cooling when the heat transfer fluid temperature is below a pre-selected low threshold. The pre-selected low and high thresholds can define a tolerance for the range of suitable heat transfer fluid temperatures for the desired pre-selected temperature of heat transfer fluid for the cooling of the pressurized gas.

The adjustment in cooling can include adjustment in the position of the expansion valve V of the heat transfer fluid cooler feed conduit 15*f*, adjustment in refrigerant pump operation to increase or decrease the flow of refrigerant fed to the heat transfer fluid cooler 15 and/or other adjustment.

The controller CTRL can be adapted for more quickly and easily accounting for pressurized gas fueling temperatures via the use of the centralized heat transfer fluid arrangement for providing heat transfer fluid for cooling of the pressurized gas. Use of a refrigerant via the refrigerant cooling circuit and heat sink source 14 to ultimately absorb the heat from the pressurized gas from the heat transfer fluid for the cooling of the pressurized gas can allow for a simpler control criteria that is able to more quickly adapt to temperature differences that may occur in operation. Also, use of the centralized heat transfer fluid storage unit 9 can permit a more refined control of temperature for the pressurized gas coolant used for cooling the pressurized gas. Embodiments can provide improved operational flexibility as well by permitting other sources of heat sink to be utilized in a way that can permit a wide range of flexibility in operation and design for providing the cooling of the pressurized gas while keeping the ultimate control of the pressurized gas fueling temperature a simpler process that can be more focused on one or a few process variables.

Figure 2:
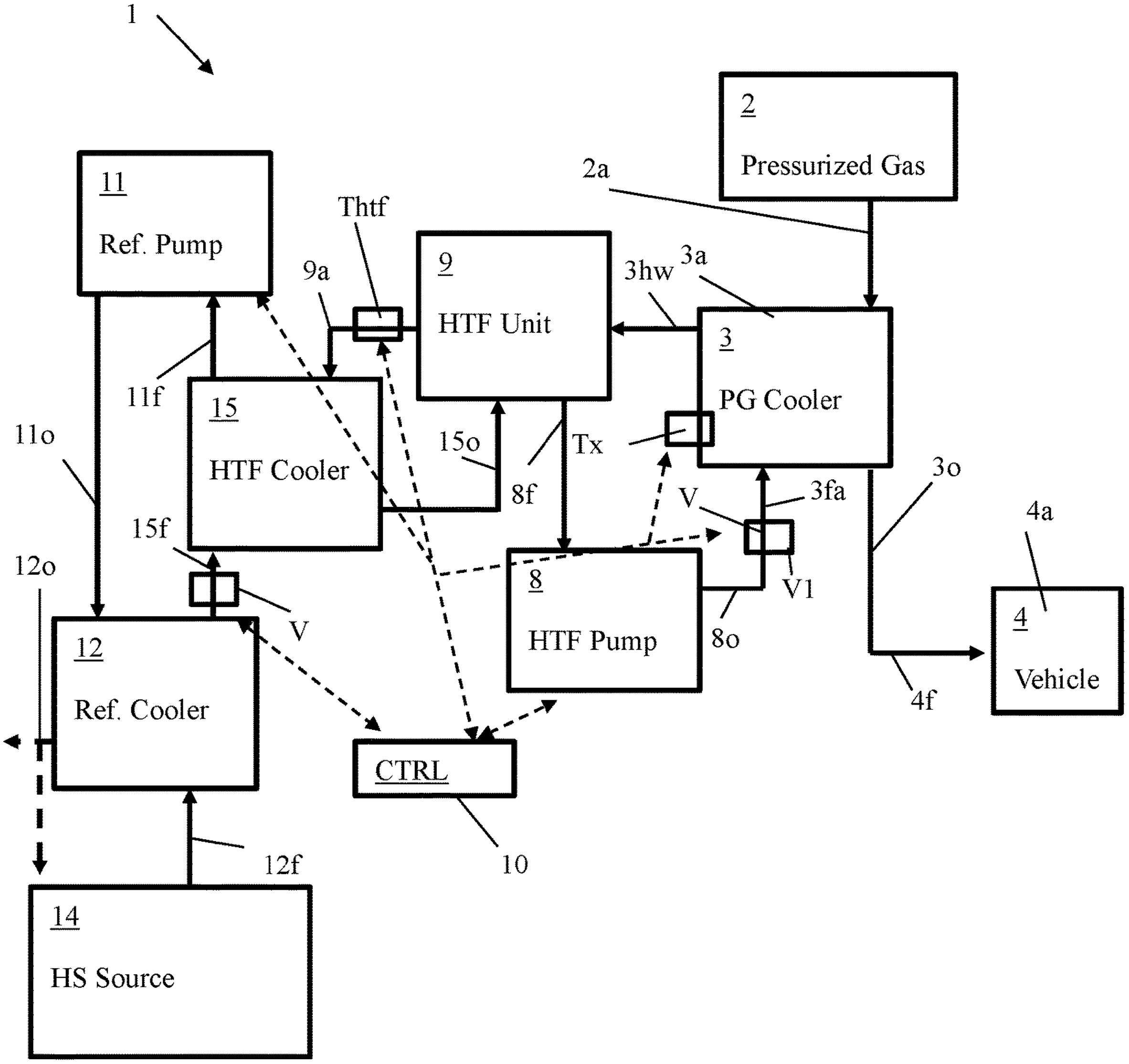
FIG. 2 is a block diagram of an exemplary implementation of the first exemplary embodiment of an apparatus 1 shown in FIG. 1.
Figure 3:
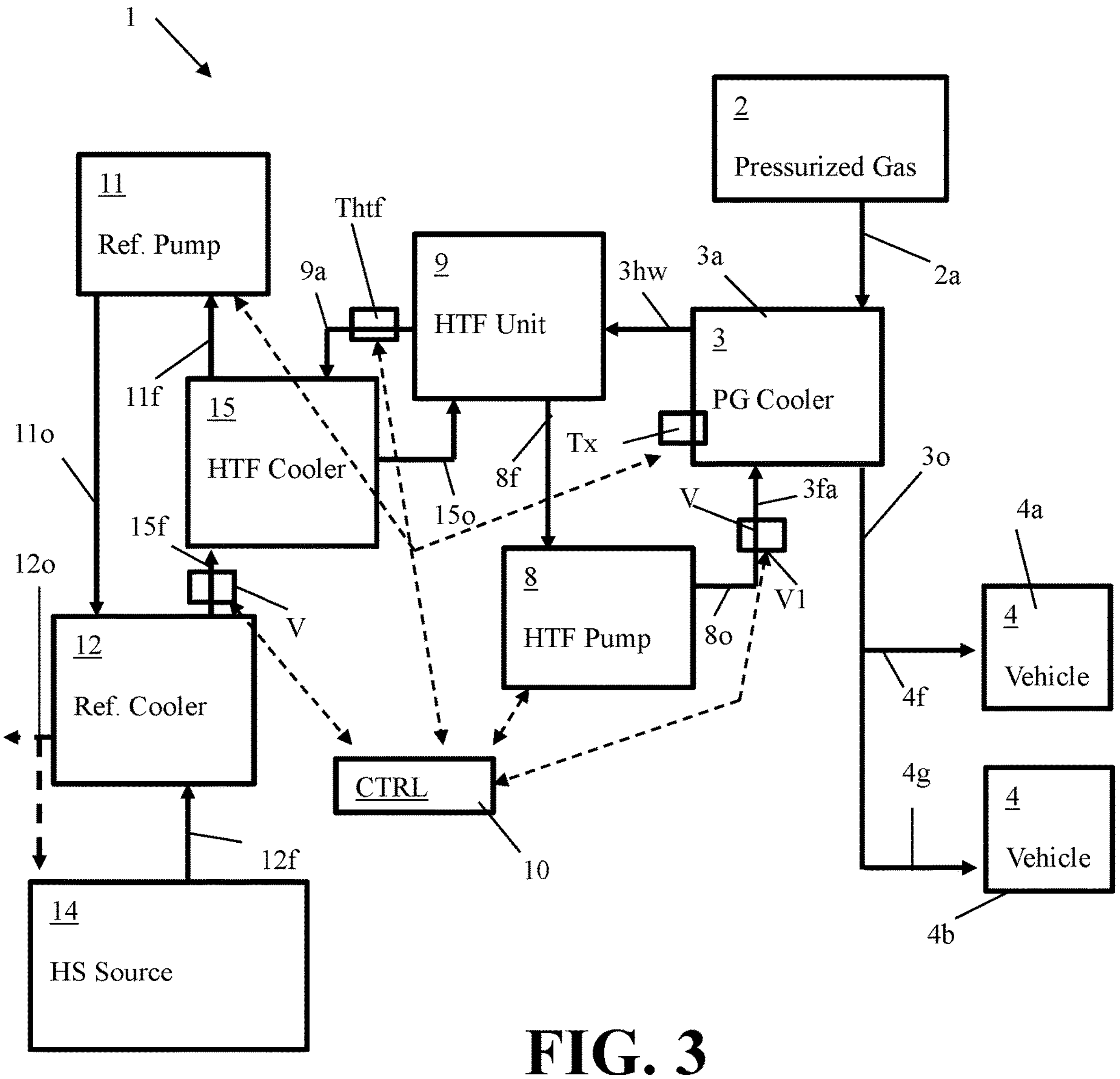
FIG. 3 is a block diagram of another exemplary implementation of the first exemplary embodiment of an apparatus 1 shown in FIG. 1.
Figure 4:
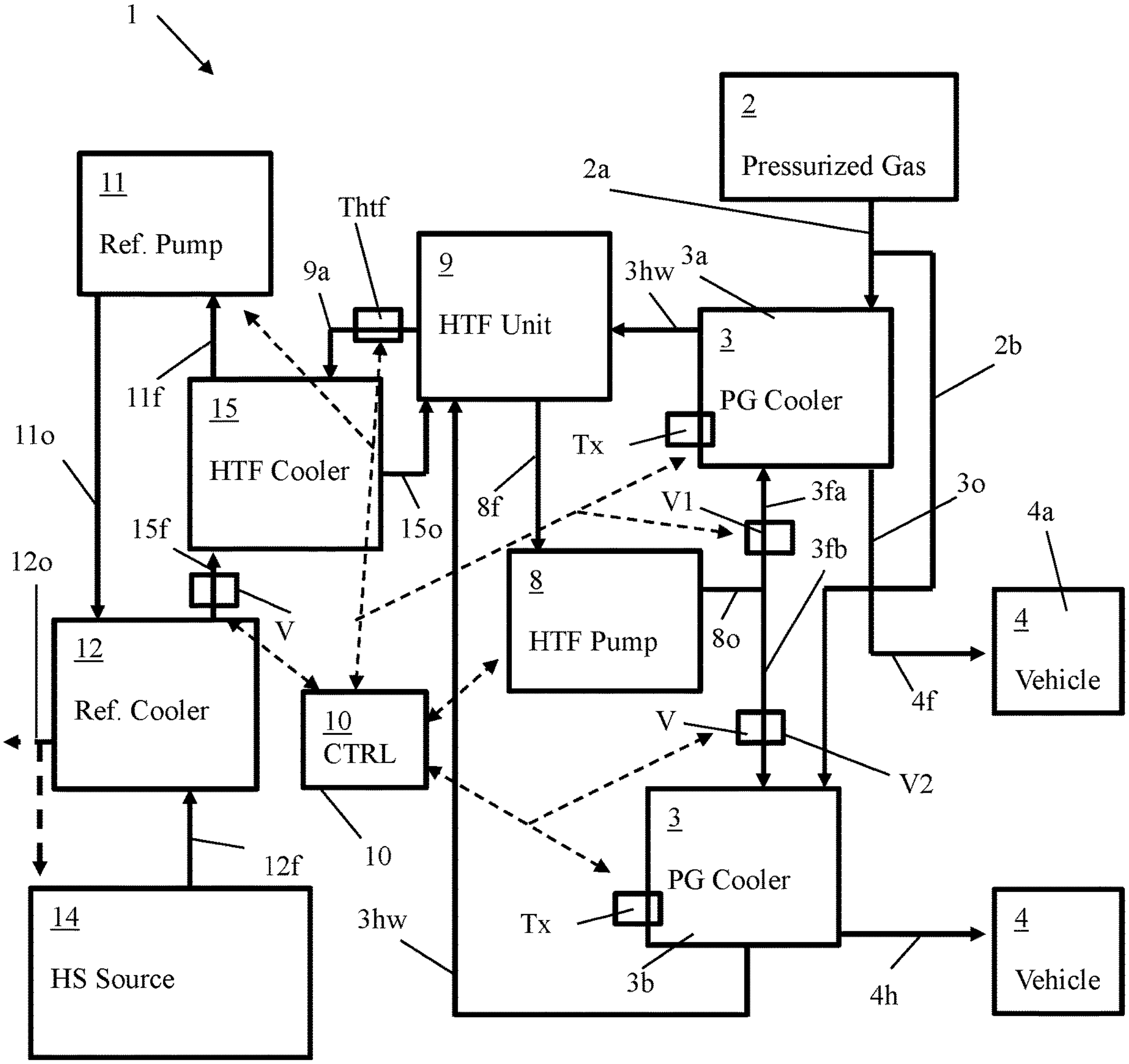
FIG. 4 is a block diagram of another exemplary implementation of the first exemplary embodiment of an apparatus 1 shown in FIG. 1.
Figure 5:
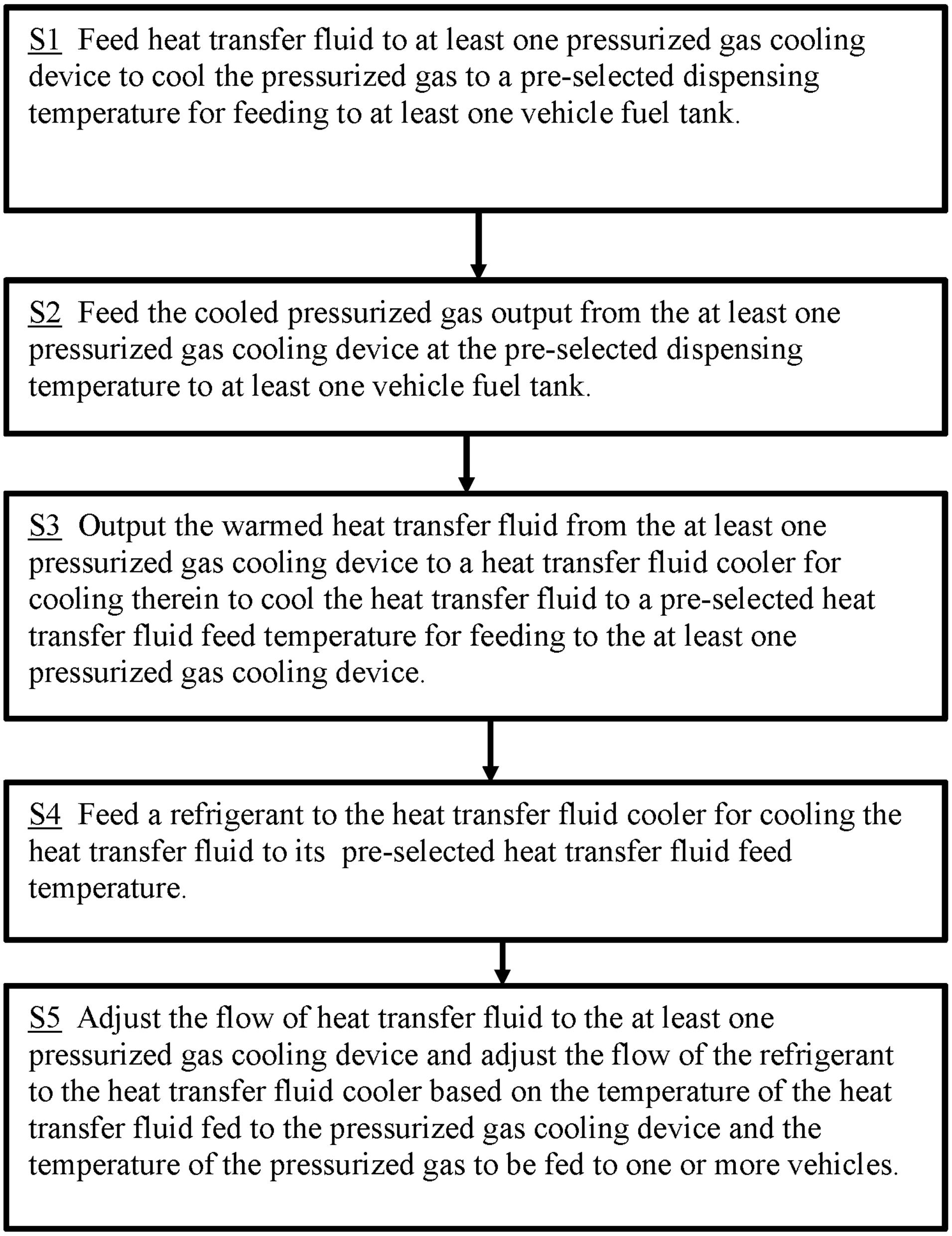
FIG. 5 is a flow chart illustrating an exemplary embodiment of our process for cooling a pressurized gas for fueling. It should be appreciated that embodiments of this process can be utilized in embodiments of the apparatus 1 for cooling a pressurized gas for fueling.

Example implementations of the apparatus 1 for cooling pressurized gas for fueling illustrated in FIG. 1 may be better appreciated from FIGS. 2-4. For instance, as shown in FIG. 2, the apparatus 1 can include a first pressurized gas cooler 3*a* that includes a pressurized gas cooler temperature sensor Tx communicatively connected to the controller CTRL. A pressurized gas storage unit or compressor (Pressurized Gas 2) can feed pressurized gas 2 comprising hydrogen or natural gas to the first pressurized gas cooler 3*a* via the first output conduit 2*a* connected between the first pressurized gas cooler 3*a* and the pressurized gas storage unit or compressor. The pressurized gas can be cooled to the pre-selected fueling temperature via the first pressurized gas cooler 3*a* and output via the first pressurized gas cooler output conduit 30. The first pressurized gas cooler output conduit 30 can be connected to the first feed conduit 4*f* for feeding the first portion of the cooled pressurized gas to a first vehicle 4*a*. This first portion of the cooled pressurized gas fed to the first vehicle 4*a* can be the entirety of the cooled pressurized gas.

The cooling of the pressurized gas via the first pressurized gas cooler 3*a* can be provided via the heat transfer fluid fed from the heat transfer fluid storage unit 9 to the first pressurized gas cooler 3*a* via the first heat transfer fluid feed conduit 3*fa* connected between the heat transfer fluid storage unit 9 and the first pressurized gas cooler 3*a*. A heat transfer fluid pump 8 can be positioned between the heat transfer fluid storage unit 9 and the first pressurized gas cooler 3*a* to help feed the heat transfer fluid to the first pressurized gas cooler 3*a*. The heat transfer fluid can be at a desired pre-selected heat transfer fluid temperature for feeding to the first pressurized gas cooler 3*a* for cooling the pressurized gas to the pre-selected fueling temperature.

The warmed heat transfer fluid that cooled the pressurized gas can be output via the heat transfer fluid output conduit 3*hw* connected between the first pressurized gas cooler 3*a* and a heat transfer fluid storage unit 9 (HTF Unit) for feeding back to the heat transfer fluid storage unit 9. The heat transfer fluid can undergo cooling so that the heat transfer fluid output for feeding to the first pressurized gas cooler 3*a* is at the desired temperature for cooling the pressurized gas to the pre-selected fueling temperature.

For example, the heat transfer fluid can be output from the heat transfer storage unit 9 for feeding to a heat transfer fluid cooler 15 for maintaining the temperature of the stored heat transfer fluid at the desired temperature or within a desired temperature range. The heat transfer fluid can be fed to the heat transfer fluid cooler 15 via the heat transfer fluid output conduit 9*a* connected between the heat transfer fluid storage unit 9 and the heat transfer fluid cooler 15 for cooling therein and subsequently output for feeding back to the heat transfer unit 9 via the cooled heat transfer fluid feed conduit 150 connected between the heat transfer fluid cooler 15 and the heat transfer fluid storage unit 9 for subsequently providing the heat transfer fluid to the pressurized gas cooler 3 at a desired pre-selected temperature.

As discussed above, the cooling of the heat transfer fluid can be provided via a refrigerant that can be cooled to a pre-selected refrigerant temperature for cooling of the heat transfer fluid and subsequently fed to the heat transfer fluid cooler 15 for cooling the heat transfer fluid. The cooling of the refrigerant can also be provided via an expansion valve V that can be connected to the heat transfer fluid cooler feed conduit 15*f* positioned between the refrigerant cooler 12 and the heat transfer fluid cooler 15 (e.g. the expansion valve V can be integrated into this conduit. The cooling of the refrigerant can be provided via fluid from a heat sink source 14 that is fed to the refrigerant cooler 12 as discussed above. The fluid of the heat sink source can provide the ultimate heat sink for absorbing the heat of the pressurized gas that is cooled via the heat transfer fluid in the first pressurized gas cooler 3*a*.

The controller 10 can be connected to a first valve V1 of the first heat transfer fluid feed conduit 3*fa*, and the heat transfer fluid pump 8 to adjust a flow rate of the heat transfer fluid fed to the first pressurized gas cooler 3*a* based on the temperature of the pressurized gas in the first pressurized gas cooler 3*a* or output from the first pressurized gas cooler 3*a* detected via the pressurized gas cooler temperature sensor Tx of the first pressurized gas cooler 3*a*. The controller CTRL can also be communicatively connected to a heat transfer fluid temperature sensor Thtf to receive data identifying the temperature of the heat transfer fluid stored in the heat transfer storage unit 9 and/or outputtable from the heat transfer cooler 15 for adjusting operation of the heat transfer fluid cooler 15 and/or refrigerant cooling circuit connected to the heat transfer fluid cooler 15 for supplying refrigerant to the heat transfer cooler 15 for cooling the heat transfer fluid. The controller CTRL can be communicatively connected to the expansion valve V of the heat transfer fluid cooler feed conduit 15*f* and/or the refrigerant pump 11 to adjust the flow of the refrigerant and/or temperature of the refrigerant being fed to the heat transfer fluid cooler feed conduit 15*f* for cooling the heat transfer fluid fed to the heat transfer fluid cooler 15, for example.

FIG. 3 illustrates an implementation similar to FIG. 2. However, the first pressurized gas cooler 3*a* in the implementation of FIG. 3 provides cooled pressurized gas to a plurality of vehicles 4 that include a first vehicle 4*a* and a second vehicle 4*b* via respective first and second feed conduits 4*f* and 4*g* connected to the first pressurized gas cooler output conduit 30. In the implementation of FIG. 3, the first portion of the cooled pressurized gas output from the first pressurized gas cooler 3*a* is fed to the first feed conduit 4*f* for fueling of the first vehicle and a second portion of the cooled pressurized gas output from the first pressurized gas cooler 3*a* is fed to the second feed conduit 4*g* for fueling of the second vehicle 4*b*.

The controller CTRL, refrigerant loop, and heat transfer loop of the apparatus 1 for cooling pressurized gas for fueling can be arranged and configured similarly to the implementation of FIG. 2. For instance, the controller can receive temperature data from the pressurized gas cooler temperature sensor Tx of the first pressurized gas cooler 3*a* and adjust the flow of heat transfer fluid to the first pressurized gas cooler 3*a* based on whether the temperature is below a pre-selected low temperature threshold and/or above a pre-selected high temperature threshold. Also, the operation of the refrigerant cooling circuit and/or heat transfer fluid cooler 15 and/or expansion valve V of the 15*f* can be adjusted based on the temperature of the heat transfer fluid detected via temperature data of the heat transfer fluid temperature sensor Thtf and/or temperature data of the pressurized gas cooler temperature sensor Tx of the first pressurized gas cooler 3*a*. For example, the expansion valve position can be further opened to provide further cooling if the heat transfer fluid is too warm (e.g. is above a pre-selected high temperature threshold for the heat transfer fluid) or can be adjusted to provide less expansion if the heat transfer fluid is too cold (e.g. is below a pre-selected low temperature threshold for the heat transfer fluid). Also, or alternatively, the refrigerant fluid flow rate can be increased when the heat transfer fluid is too warm (e.g. is above the pre-selected high temperature threshold for the heat transfer fluid) or can be lowered when the heat transfer fluid is too cold (e.g. is below a pre-selected low temperature threshold) for the heat transfer fluid). Such flow rate adjustment can be provided via adjustment of a valve and/or via adjustment in the speed of the refrigerant pump 11.

FIG. 4 illustrates another implementation of the first exemplary embodiment of the apparatus for cooling pressurized gas for fueling that can utilize multiple pressurized gas coolers 3 for cooling pressurized gas to be fed to respective vehicles. The multiple pressurized gas coolers 3 include a first pressurized gas cooler 3*a* and a second pressurized gas cooler 3*b*. Each pressurized gas cooler 3 can be positioned and configured to cool pressurized gas for feeding cooled pressurized gas to one or more vehicles 4 at one or more dispensers.

For example, the first pressurized gas cooler 3*a* can include a pressurized gas cooler temperature sensor Tx communicatively connected to the controller CTRL. The pressurized gas storage unit or compressor (Pressurized Gas) can feed pressurized gas 2 comprising hydrogen or natural gas to the first pressurized gas cooler 3*a* via the first output conduit 2*a* connected between the first pressurized gas cooler 3*a* and the pressurized gas storage unit or the compressor. The pressurized gas can be cooled to the pre-selected fueling temperature via the first pressurized gas cooler 3*a* and output via the first pressurized gas cooler output conduit 30. The first pressurized gas cooler output conduit 30 can be connected to the first feed conduit 4*f* for feeding the first portion of the cooled pressurized gas to a first vehicle 4*a*. This first portion of the cooled pressurized gas fed to the first vehicle 4*a* can be the entirety of the cooled pressurized gas.

The second pressurized gas cooler 3*b* includes a pressurized gas cooler temperature sensor Tx communicatively connected to the controller CTRL. The pressurized gas storage unit or compressor (Pressurized Gas) can feed pressurized gas 2 comprising hydrogen or natural gas to the second pressurized gas cooler 3*b* via the second output conduit 2*b* connected between the second pressurized gas cooler 3*b* and the pressurized gas storage unit or the compressor. The pressurized gas can be cooled to the pre-selected fueling temperature via the second pressurized gas cooler 3*b* and output via a cooled pressurized gas output conduit 4*h* connected between the second pressurized gas cooler 3*b* and one or more vehicles 4. These one or more vehicles can be considered one or more second vehicles.

The cooling medium fed to the first and second pressurized gas coolers 3*a* and 3*b* for cooling the pressurized gas fed thereto can be from the same heat transfer fluid storage unit 9. For example, a first portion of the heat transfer fluid output from the heat transfer fluid storage unit 9 can be fed to the first pressurized gas cooler 3*a* for functioning as the cooling medium therein for cooling the pressurized gas via the first heat transfer fluid feed conduit 3*fa* connected between the heat transfer fluid storage unit 9 and the first pressurized gas cooler 3*a*. A second portion of the heat transfer fluid output from the heat transfer fluid storage unit 9 can be fed to the second pressurized gas cooler 3*b* for functioning as the cooling medium therein for cooling the pressurized gas fed to the second pressurized gas cooler via the via the second output conduit 2*b*. The second portion of the heat transfer fluid can be fed to the second pressurized gas cooler 3*b* via a second heat transfer fluid feed conduit 3*fb* connected between the heat transfer fluid storage unit 9 and the second pressurized gas cooler 3*b*.

The warmed heat transfer fluid can be output from each of the pressurized gas coolers 3 for feeding to the heat transfer fluid storage unit 9. For example, warmed heat transfer fluid output from the first pressurized gas cooler 3*a* can be fed to the heat transfer fluid storage unit 9 via a first heat transfer fluid output conduit 3*hw* connected between the first pressurized gas cooler 3*a* and the heat transfer fluid storage unit 9 and warmed heat transfer fluid output from the second pressurized gas cooler 3*b* can be fed to the heat transfer fluid storage unit 9 via a second heat transfer fluid output conduit 3*hw* connected between the second pressurized gas cooler 3*b* and the heat transfer fluid storage unit 9. The heat transfer fluid output conduits 3*hw* can be interconnected between the heat transfer fluid storage unit 9 and the pressurized gas coolers 3 for merging the warmed heat transfer fluid from the different pressurized gas cooler devices 3 prior to feeding the fluid to the heat transfer fluid storage unit 9 or can be entirely separate conduit arrangements based on the design criteria of the apparatus and other design considerations.

The first heat transfer fluid feed conduit 3*fa* can include a first valve V1 and the second heat transfer fluid feed conduit 3*fb* can include a second valve V2. Adjustment in the positioning of the first valve V1 and the second valve V2 can adjust a flow rate of the heat transfer fluid fed to the different pressurized gas coolers 3. In some embodiments, the first valve V1 and the second valve V2 can be on/off valves that can be adjusted between open and closed positions. In other implementations, the first valve V1 and the second valve V2 can have multiple different open positions between a fully open position and a closed position. The valves V can be communicatively connected to the controller CTRL such that the controller can communicate with the valves for actuating adjustment of the positions of the valves V based on the temperature data from the temperature sensors Tx of the first and second pressurized gas coolers 3*a* and 3*b*.

For instance, the controller CTRL can receive temperature data from the pressurized gas cooler temperature sensor Tx of the first pressurized gas cooler 3*a* and adjust the flow of heat transfer fluid to the first pressurized gas cooler 3*a* based on whether the temperature is below a pre-selected low temperature threshold and/or above a pre-selected high temperature threshold. Such adjustment can be provided via adjustment of the position of the first valve V1 and/or adjustment in speed of the heat transfer fluid pump 8 as discussed above. Also, the controller CTRL can receive temperature data from the pressurized gas cooler temperature sensor Tx of the second pressurized gas cooler 3*b* and adjust the flow of heat transfer fluid to the second pressurized gas cooler 3*b* based on whether the temperature is below a pre-selected low temperature threshold and/or above a pre-selected high temperature threshold. Such adjustment can be provided via adjustment of the position of the second valve V2 and/or adjustment in speed of the heat transfer fluid pump 8 as discussed above.

The controller CTRL, refrigerant loop, and heat transfer loop of the apparatus 1 for cooling pressurized gas for fueling can be arranged and configured similarly to the implementation of FIGS. 2 and 3. For instance, the controller CTRL can receive temperature data from the pressurized gas cooler temperature sensors Tx of the first pressurized gas cooler 3*a* and second pressurized ga cooler 3*b* and adjust the flow of heat transfer fluid to the first pressurized gas cooler 3*a* and/or second pressurized gas cooler based on whether the temperatures are below the pre-selected low temperature threshold and/or above the pre-selected high temperature threshold. Also, the operation of the refrigerant cooling circuit and/or heat transfer fluid cooler 15 and/or expansion valve V of the 15*f* can be adjusted based on the temperature of the heat transfer fluid detected via temperature data of the heat transfer fluid temperature sensor Thtf and/or temperature data of the pressurized gas cooler temperature sensors Tx. For example, the expansion valve position for the refrigerant cooling circuit can be further opened to provide further cooling if the heat transfer fluid is too warm (e.g. is above a pre-selected high temperature threshold for the heat transfer fluid) or can be adjusted to provide less expansion if the heat transfer fluid is too cold (e.g. is below a pre-selected low temperature threshold for the heat transfer fluid). Also, or alternatively, the refrigerant fluid flow rate can be increased when the heat transfer fluid is too warm (e.g. is above the pre-selected high temperature threshold for the heat transfer fluid) or can be lowered when the heat transfer fluid is too cold (e.g. is below a pre-selected low temperature threshold) for the heat transfer fluid). Such flow rate adjustment can be provided via adjustment of a valve and/or via adjustment in the speed of the refrigerant pump 11.

Figure 7:
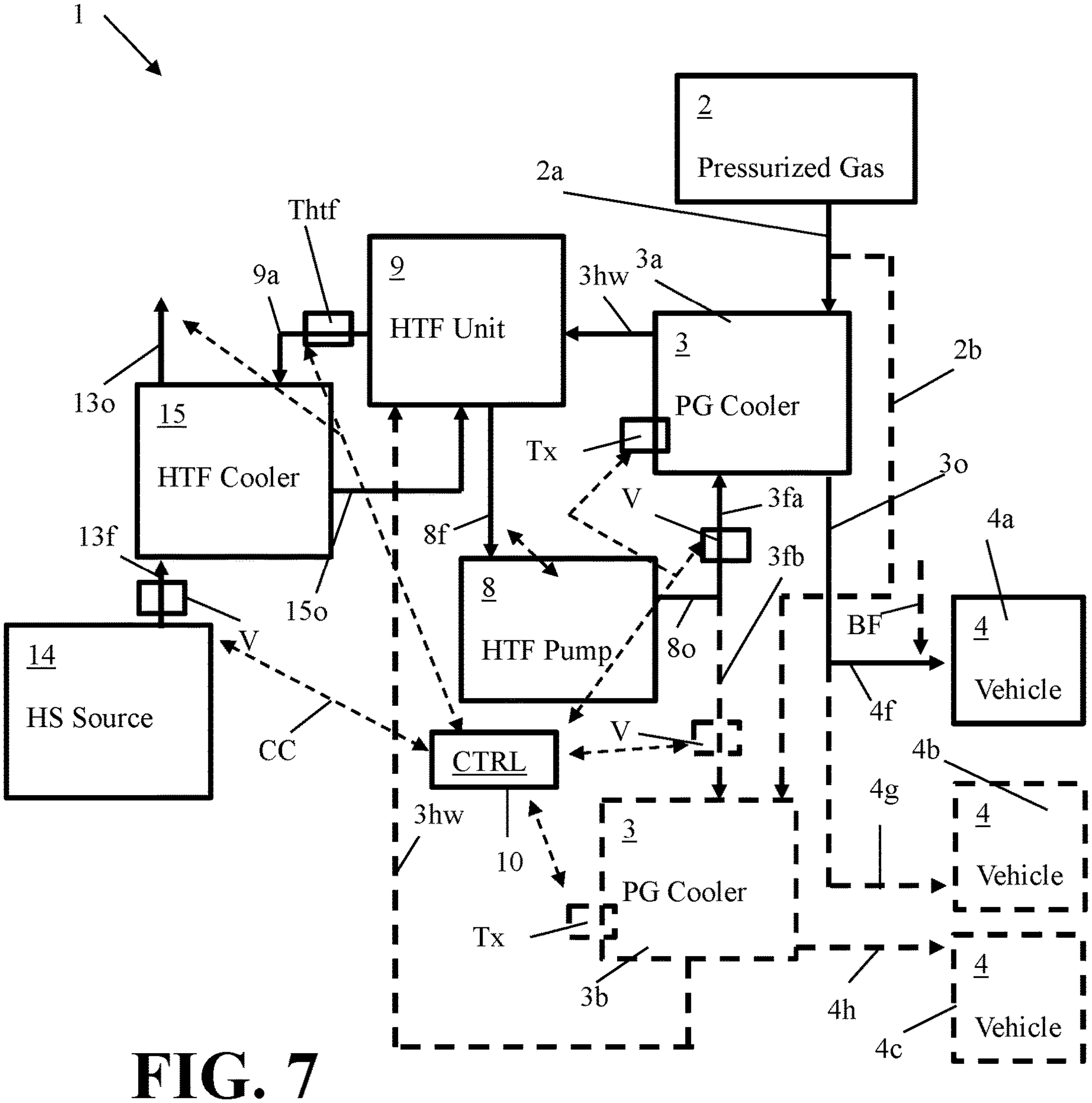
FIG. 7 is a block diagram of a second exemplary embodiment of an apparatus 1 for cooling a pressurized gas for fueling.

Referring to FIG. 7, embodiments of the apparatus 1 for cooling pressurized gas for fueling can be arranged so that there is no need for a refrigerant circuit for cooling the heat transfer fluid. Instead, the heat sink fluid can be utilized to more directly absorb the heat of the heat transfer fluid that was acquired from the pressurized process gas. For example, the heat transfer fluid cooler 15 can directly receive fluid from the heat sink source 14 via a heat sink source feed conduit 13*f* connected between the heat sink source 14 and the heat transfer fluid cooler 15 for cooling the heat transfer fluid. The warmed heat sink fluid that absorbed heat from the heat transfer fluid can be output via a heat sink fluid output conduit 13*o* connected to the heat transfer fluid cooler 15. The heat sink fluid output conduit 13*o* can route the warmed heat sink fluid to another process unit, back to the heat sink source 14, or vent it as may be desired for a particular set of design criteria.

Such embodiments can optionally also include the expansion valve V in the heat sink source feed conduit 13*f* to expand and further cool the heat sink fluid before it is fed to the heat transfer fluid cooler 15. The controller CTRL can be connected to the expansion valve V to adjust its position based on the temperature of the heat transfer fluid detected via the heat transfer fluid temperature sensor Thtf as discussed above, when the expansion valve V is utilized.

Some embodiments can be configured so that the fuel fed to the vehicle includes other pressurized gas from another source besides the pressurized gas storage unit or the compressor. For instance, a flow of bypass fluid BF (shown in broken line in FIGS. 1 and 7) can be fed to a vehicle. The bypass fluid BF can be fluid that is pressurized gas formed via vaporization of a liquid cryogenic fluid (e.g. liquid hydrogen or liquid natural gas) that is at a suitable fueling pressure and temperature for feeding to the vehicle. The utilization of such bypass fluid BF can help reduce the cooling demand for cooling of the pressurized gas 2 from the pressurized gas storage unit or compressor.

Figure 6:
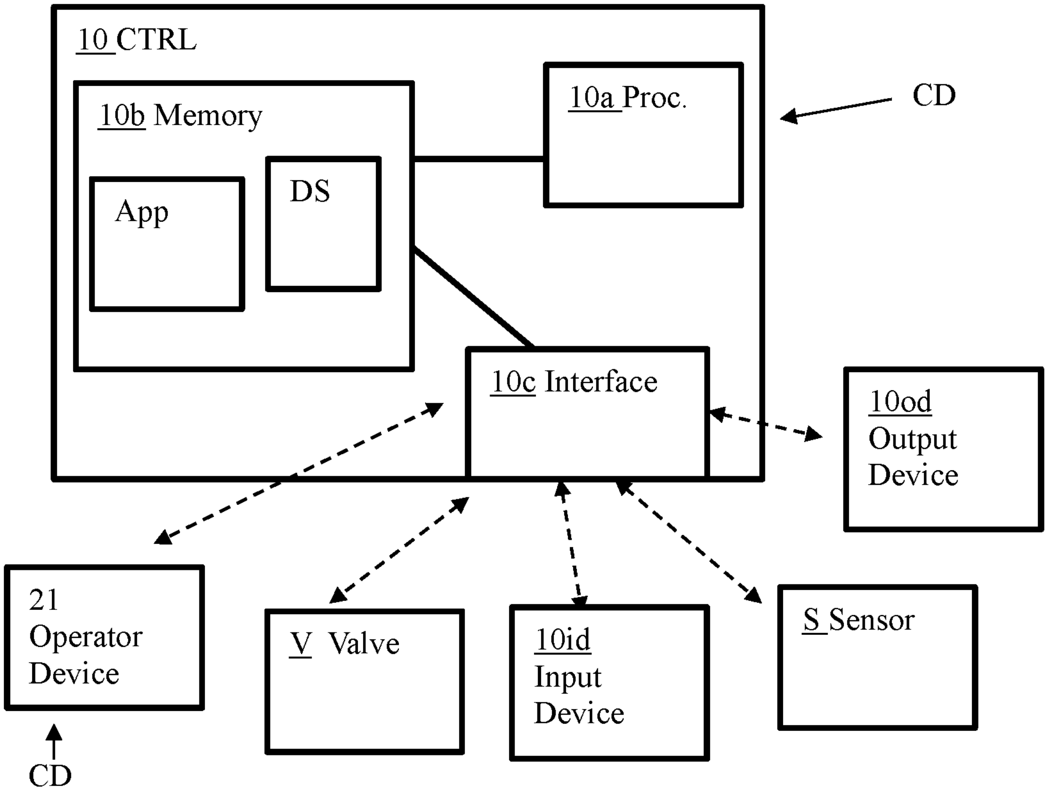
FIG. 6 is a block diagram of an exemplary embodiment of a controller 10 (CTRL) that can be utilized in the first exemplary embodiment of the apparatus 1 and the exemplary implementations of the first exemplary embodiment of the apparatus 1 shown in FIGS. 1-4 and the second exemplary embodiment of the apparatus 1 shown in FIG. 7.

As may best be appreciated from FIG. 6, the controller 10 (CTRL) that can be utilized in embodiments of the apparatus 1 for cooling pressurized gas for fueling can be a computer device CD. The controller can include a processor 10*a* (Proc.) connected to non-transitory memory 10*b* (Memory) that has one or more applications (App) stored thereon and a number of data stores (DS) stored thereon. The controller can also include one or more interfaces 10*c* (Interface). Each interface 10*c* can include a transceiver for communicative connections with one or more input devices 10*id*, one or more output devices 10*od*, one or more sensors S (e.g. pressurized gas cooling device temperature sensor(s) Thx and/or heat transfer fluid temperature sensor Thtf, etc.), one or more other computer devices CD, and/or one or more valves V. The transceiver(s) of the interface 10*c* can include at least one local area network connection transceiver, at least one wide area network connection transceiver and/or at least one near field communication transceiver. The transceivers can be configured for communications that can be facilitated via wireless communication and/or hard wired communicative connections.

It should be appreciated that at least some communicative connections can utilize other elements for the communicative connection. For example, some wireless communicative connections can involve use of an access point, router, or intermediate nodes.

Examples of input devices 10*id* that can be connected to the controller 10 can include buttons, a keypad, a keyboard, a stylus, a microphone, or a touch screen. Examples of output devices 10*od* that can be connected to the controller 10 can include a display, a printer, and/or a speaker. For example, the controller 10 can be configured to illustrate a graphical user interface (GUI) on a display to facilitate a user providing input to the controller 10 for use of input provided by a user's interaction with the GUI via a touch screen display, pointer device and/or keyboard.

In some embodiments, the controller 10 can be a controller that is communicatively connectable to an operator device 21, which can be a computer device CD that can be configured to run an automated process control system or other type of process control scheme that includes the controller 10 and various elements of the apparatus 1 to which the controller 10 is connected. The automated process control system of the operator device 21 can oversee and/or help monitor operations of a fueling station and/or related operations, for example.

Embodiments of our process for cooling a pressurized gas for fueling can be utilized in embodiments of our apparatus 1 and/or embodiments of a pressurized gas fueling station (e.g. a hydrogen fueling station or a natural gas fueling station, etc.) Examples of such a process can be appreciated from the above as well as the exemplary embodiment illustrated in FIG. 5. For example, in the exemplary embodiment of our process shown in FIG. 5, the process can include a first step S1 that can include feeding a heat transfer fluid to at least one pressurized gas cooling device (PG cooler) to cool the pressurized gas to a pre-selected dispensing temperature for feeding to at least one vehicle fuel tank. Examples of such a first step S1 can be appreciated from the above discussion of feeding heat transfer fluid to the first pressurized gas cooler 3*a* and/or second pressurized gas cooler 3*b*.

In a second step S2, the cooled pressurized gas output from one or more pressurized gas cooling devices can be fed to the one or more vehicle fuel tanks at a pre-selected dispensing temperature. The pre-selected dispensing temperature can be the pre-selected fueling temperature or a temperature that is provided based on the pressurized gas at the pre-selected fueling temperature warming slightly as it is fed to at least one dispenser for feeding to one or more vehicle fuel tanks. Examples of such feeding of cooled pressurized gas can be appreciated from the above discussion of outputting of cooled pressurized gas from the first pressurized gas cooler 3*a* and/or second pressurized gas cooler 3*b* for feeding cooled pressurized gas to one or more vehicles 4.

In a third step S3, warmed heat transfer fluid can be output from the one or more pressurized gas cooling devices to a heat transfer fluid cooler for cooling the heat transfer fluid to a pre-selected heat transfer fluid feed temperature. For example, warmed heat transfer fluid can be output from one or more pressurized gas coolers 3 and fed to the heat transfer fluid storage unit 9 for subsequently being cooled via the heat transfer fluid cooler 15 for maintaining the temperature of the heat transfer fluid at a pre-selected desired heat transfer fluid feed temperature for subsequently feeding that heat transfer fluid to one or more pressurized gas coolers 3 as discussed above.

As an alternative, fluid from the heat sink source 14 can be fed directly to the heat transfer cooler 15 to function as the cooling medium in the heat transfer cooler 15 for more directly cooling the heat transfer fluid with the fluid of the heat sink source 14 in the third step S3. In such an arrangement, the refrigerant circuit including the refrigerant pump 11 and refrigerant cooler 12 may not be used or needed.

In a fourth step S4, refrigerant can be fed to the heat transfer fluid cooler 15 for cooling the heat transfer fluid to the desired temperature (e.g. a pre-selected heat transfer fluid feed temperature). The refrigerant output from the heat transfer fluid cooler 15 can be warmed refrigerant that is subsequently fed to a refrigerant cooler 12 for being cooled via a heat sink fluid from a heat sink source 14 as discussed above. The refrigerant can also be further cooled via an expansion valve V as discussed above for being returned to a desired refrigerant feed temperature for feeding to the heat transfer fluid cooler 15 for cooling the heat transfer fluid. Examples of the processing of the refrigerant in a refrigerant circuit can be appreciated from the above discussed exemplary implementation options for the first exemplary embodiment of the apparatus 1 for cooling pressurized gas for fueling.

In a fifth step S5, the flow of heat transfer fluid fed to one or more pressurized gas cooling devices can be adjusted. Also, the flow of refrigerant to a heat transfer cooler 15 can be adjusted. These adjustments can be based on the temperature of the heat transfer fluid fed to the one or more pressurized gas cooling devices and the temperature of the cooled pressurized gas to be fed to one or more vehicles 4. Examples of these types of adjustments are discussed above.

Embodiments of the process can also include other steps or features. For example, the process can include the controller 10 receiving data from one or more temperature sensors for adjustment in the flow of heat transfer fluid to one or more pressurized gas cooling devices (e.g. a pressurized gas cooler 3), and/or actuating adjustment of the heat transfer fluid pump and/or one or more valves V to adjust the flow rate or heat transfer fluid to one or more pressurized gas cooling devices based on the temperature data from one or more temperature sensors. As another example, the operation of a refrigerant pump 11 and/or expansion valve V can be adjusted via the controller CTRL based on such temperature data.

It should be appreciated that additional modifications or other modifications to the embodiments explicitly shown and discussed herein can be made to meet a particular set of design objectives or a particular set of design criteria. For instance, it should be appreciated that the heat sink source 14 (HS Source) can be any of a number of different suitable options. For example, the heat sink source 14 can be a cooling tower, a secondary cooling loop and/or other process gas as discussed above. As another example, the type of refrigerant used as the refrigerant and the type of heat transfer fluid used as the heat transfer fluid can be any of a number of suitable fluids. For example, the refrigerant of the refrigerant loop used for cooling the heat transfer fluid via the fluid of the heat sink source 14 absorbing the heat of the heat transfer fluid absorbed by the refrigerant can include nitrogen, carbon dioxide, D-limonene, potassium formate solutions (e.g. FP40, etc.) or silicone polymer based fluids (e.g. Syltherm XLT, etc.), or another suitable refrigerant. Preferably, the selected refrigerant can be cooled via the fluid of the heat sink source and/or the expansion valve V to a pre-selected heat transfer fluid feed temperature that can be −20° C. or less than −20° C. (e.g. between −20° C. and −70° C. or between −20° C. and −50° C., etc.). The heat transfer fluid can be nitrogen, carbon dioxide, D-limonene, a potassium formate solution (e.g. FP40, etc.) a silicone polymer based fluid (e.g. Syltherm XLT, etc.), R404a, R449a, R507a, or other suitable fluid.

Each pressurized gas cooler 3 can be any type of suitable heat exchanger. In some embodiments, the pressurized gas cooler 3 can be a diffusion bonded heat exchanger. Alternatively, the pressurized gas cooler(s) 3 can be a countercurrent heat exchangers, tube and shell heat exchangers, plate-fin heat exchanger or other type of suitable heat exchanger.

Also, each heat transfer fluid cooler 15 and refrigerant cooler 12 can be a suitable type of heat exchanger. For instance, the heat transfer fluid cooler 15 can be a countercurrent heat exchanger, co-current heat exchanger, tube and shell heat exchanger, plate-fin heat exchanger or other type of suitable heat exchanger. The refrigerant cooler 12 can be a countercurrent heat exchanger, co-current heat exchanger, tube and shell heat exchanger, plate-fin heat exchanger, mechanical chiller, absorption chiller, or other type of suitable heat exchanger.

The heat transfer fluid pump 8 and/or the refrigerant pump 11 can each be a pump or compressor. In some embodiments, the heat transfer fluid pump 8 and/or the refrigerant pump 11 can utilize a variable frequency drive that can be communicatively connected to the controller CTRL for adjustment of the operation to adjust a flow rate of refrigerant and/or heat transfer fluid as discussed above.

The pressurized gas storage unit that can provide pressurized gas 2 can store a gas at an elevated pressure (e.g. a pressure greater than 1 atm). The stored pressure can be any suitable pressure for that particular gas for being fed to a vehicle fuel tank in embodiments configured to utilize a pressurized gas storage unit for the source of pressurized gas 2.

The apparatus 1 can also include a dispenser with a hose and nozzle for coupling to a vehicle fuel tank for feeding the pressurized gas to the vehicle fuel tank. The fuel fed to the pressurized fuel tank can also include pressurized gas formed from vaporizing cryogenic liquid into a gas and subsequently heating the gas so the gas is at a suitable pressure and temperature for feeding to the dispenser for fueling of the vehicle fuel tank. This type of supply can occur via a bypass arrangement so it can occur in series or in parallel to providing of the pressurized gas after it is cooled via a pressurized gas cooler 3.

In some embodiments, it is contemplated that the heat transfer fluid can be cooled directly via the heat sink source fluid as discussed above with reference to the exemplary embodiment of FIG. 7. In such embodiments, the refrigerant cooler and refrigerant pump may not be utilized. Instead, the heat sink source can feed fluid to the heat transfer cooler 15 for being used as the refrigerant for cooling the heat transfer fluid in a more direct relationship.

As yet other examples, the arrangement of valves, piping, and other conduit elements (e.g., conduit connection mechanisms, tubing, seals, valves, etc.) for interconnecting different units of the apparatus for fluid communication of the flows of fluid between different elements (e.g., pumps, heat exchangers, compressors, storage vessels, etc.) can be arranged to meet a particular plant layout design that accounts for available area of the plant, sized equipment of the plant, and other design considerations. As another example, the flow rate, pressure, and temperature of the fluid passed through the various apparatus or system elements can vary to account for different design configurations and other design criteria.

Embodiments of our process, apparatus, and system can each be configured to include process control elements positioned and configured to monitor and control operations (e.g., temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the plant, etc.). It should be appreciated that embodiments can utilize a distributed control system (DCS) for implementation of one or more processes and/or controlling operations of an apparatus as well.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of our process, apparatus, system, and methods of making and using the same have been shown and described above, it is to be distinctly understood that the invention is not limited thereto but may be otherwise variously embodied and practiced within the scope of the following claims.

What is claimed is:

1. An apparatus for cooling a pressurized gas for fueling, the apparatus comprising:

a first pressurized gas cooler positioned to receive a first stream of pressurized gas from a pressurized gas storage unit or compressor to cool the first stream of the pressurized gas to a pre-selected fueling temperature;

the first pressurized gas cooler positioned to receive a first portion of heat transfer fluid from a heat transfer fluid storage unit for cooling of the first stream of the pressurized gas;

the first pressurized gas cooler connected to an output conduit to output the first stream of the pressurized gas at the pre-selected fueling temperature for feeding to at least one vehicle for fueling of the at least one vehicles;

the heat transfer fluid storage unit;

a heat transfer fluid pump positioned between the heat transfer fluid storage unit and the first pressurized gas cooler for feeding the first portion of the heat transfer fluid to the first pressurized gas cooler;

a heat transfer fluid cooler positioned to receive heat transfer fluid from the heat transfer fluid storage unit for cooling the heat transfer fluid;

the heat transfer fluid cooler positioned to receive a refrigerant as a cooling medium for cooling of the heat transfer fluid;

a refrigerant cooler positioned to receive refrigerant output form the heat transfer fluid cooler as warmed refrigerant to cool the warmed refrigerant, the refrigerant cooler also positioned to receive heat sink fluid from a heat sink source as a cooling medium for cooling the warmed refrigerant; and an expansion valve positioned to receive the refrigerant to expand the refrigerant and reduce a temperature of the refrigerant before the refrigerant is fed to the heat transfer fluid cooler, the expansion valve positioned between the refrigerant cooler and the heat transfer fluid cooler.

2. The apparatus of claim 1, wherein the at least one vehicle comprises a first vehicle and the output conduit is connected to a first feed conduit to feed a first portion of the first stream of the pressurized gas to the first vehicle after the first stream of pressurized gas is cooled to the pre-selected fueling temperature.

3. The apparatus of claim 2, wherein the at least one vehicle also comprises a second vehicle and the output conduit is connected to a second feed conduit to feed a second portion of the first stream of the pressurized gas to the second vehicle after the first stream of pressurized gas is cooled to the pre-selected fueling temperature.

4. The apparatus of claim 3, comprising:

a second pressurized gas cooler positioned to receive a second stream of pressurized gas from the pressurized gas storage unit or the compressor to cool the second stream of the pressurized gas to the pre-selected fueling temperature;

the second pressurized gas cooler positioned to receive a second portion of heat transfer fluid from the heat transfer fluid storage unit for cooling of the second stream of the pressurized gas;

the second pressurized gas cooler connected to an output conduit to output the second stream of the pressurized gas at the pre-selected fueling temperature for feeding to at least one third vehicle for fueling of the at least one third vehicle.

5. The apparatus of claim 2, comprising:

a second pressurized gas cooler positioned to receive a second stream of pressurized gas from the pressurized gas storage unit or the compressor to cool the second stream of the pressurized gas to the pre-selected fueling temperature;

the second pressurized gas cooler positioned to receive a second portion of heat transfer fluid from the heat transfer fluid storage unit for cooling of the second stream of the pressurized gas;

the second pressurized gas cooler connected to an output conduit to output the second stream of the pressurized gas at the pre-selected fueling temperature for feeding to at least one second vehicle for fueling of the at least one second vehicle.

6. The apparatus of claim 1, comprising:

a heat transfer fluid cooler positioned to receive heat transfer fluid from the heat transfer fluid storage unit for cooling the heat transfer fluid;

the heat transfer fluid cooler positioned to receive a refrigerant or a heat sink fluid from a heat sink source for cooling of the heat transfer fluid.

7. The apparatus of claim 1, comprising:

a heat transfer fluid cooler positioned to receive heat transfer fluid from the heat transfer fluid storage unit for cooling the heat transfer fluid;

the heat transfer fluid cooler positioned to receive a refrigerant as a cooling medium for cooling of the heat transfer fluid; and an expansion valve positioned to receive the refrigerant to expand the refrigerant and reduce a temperature of the refrigerant before the refrigerant is fed to the heat transfer fluid cooler.

8. A process for cooling a pressurized gas for fueling, the process comprising:

feeding heat transfer fluid to at least one pressurized gas cooling device to cool pressurized gas to a pre-selected temperature for feeding to at least one vehicle fuel tank;

outputting the heat transfer fluid from the at least one pressurized gas cooling device after the heat transfer fluid is warmed via cooling of the pressurized gas for feeding the heat transfer fluid toward a heat transfer fluid cooler for cooling the heat transfer fluid;

feeding a refrigerant or a heat sink fluid to the heat transfer fluid cooler to cool the heat transfer fluid to a pre-selected heat transfer fluid temperature; and adjusting a flow of the heat transfer fluid to the at least one pressurized gas cooling device based on a temperature of the pressurized gas output from the at least one pressurized gas cooling device for feeding to the at least one vehicle fuel tank;

wherein the adjusting of the flow of the heat transfer fluid to the at least one pressurized gas cooling device based on the temperature of the pressurized gas output from the at least one pressurized gas cooling device for feeding to the at least one vehicle fuel tank comprises:

adjusting a flow rate of the heat transfer fluid based on temperature data from at least one temperature sensor of the at least one pressurized gas cooling device; and adjusting a flow rate of the refrigerant or the heat sink fluid to the heat transfer fluid cooler and adjusting a position of an expansion valve for expansion of the refrigerant and the heat sink fluid based on the temperature data from the at least one temperature sensor of the at least one pressurized gas cooling device and temperature data from a heat transfer fluid temperature sensor.

9. The process of claim 8, wherein the feeding of the heat transfer fluid to the at least one pressurized gas cooling device to cool pressurized gas to the pre-selected temperature for feeding to the at least one vehicle fuel tank comprises:

feeding a first portion of the heat transfer fluid to a first pressurized gas cooling device of the at least one pressurized gas cooling device.

10. The process of claim 9, wherein the adjusting the flow of the heat transfer fluid to the at least one pressurized gas cooling device based on the temperature of the pressurized gas output from the at least one pressurized gas cooling device for feeding to the at least one vehicle fuel tank comprises:

adjusting a flow rate of the first portion of the heat transfer fluid based on temperature data from a temperature sensor of the first pressurized gas cooling device.

11. The process of claim 10, wherein the feeding of the heat transfer fluid to the at least one pressurized gas cooling device to cool pressurized gas to the pre-selected temperature for feeding to the at least one vehicle fuel tank also comprises:

feeding a second portion of the heat transfer fluid to a second pressurized gas cooling device of the at least one pressurized gas cooling device.

12. The process of claim 11, wherein the adjusting the flow of the heat transfer fluid to the at least one pressurized gas cooling device based on the temperature of the pressurized gas output from the at least one pressurized gas cooling device for feeding to the at least one vehicle fuel tank also comprises:

adjusting a flow rate of the second portion of the heat transfer fluid based on temperature data from a temperature sensor of the second pressurized gas cooling device.

13. The process of claim 8, comprising:

adjusting a flow rate of the refrigerant or the heat sink fluid to the heat transfer fluid cooler based on the temperature data from the at least one temperature sensor of the at least one pressurized gas cooling device and/or temperature data from a heat transfer fluid temperature sensor.

14. The process of claim 8, wherein the feeding of the heat transfer fluid to the at least one pressurized gas cooling device to cool pressurized gas to the pre-selected temperature for feeding to the at least one vehicle fuel tank comprises:

feeding a first portion of the heat transfer fluid to a first pressurized gas cooling device of the at least one pressurized gas cooling device; and feeding a second portion of the heat transfer fluid to a second pressurized gas cooling device of the at least one pressurized gas cooling device;

and wherein the process also comprises:

feeding a first stream of the pressurized gas to the first pressurized gas cooling device to cool the first stream of the pressurized gas to the pre-selected temperature for feeding to at least one first vehicle; and feeding a second stream of the pressurized gas to the second pressurized gas cooling device to cool the second stream of the pressurized gas to the pre-selected temperature for feeding to at least one second vehicle.

15. An apparatus for cooling a pressurized gas for fueling, the apparatus comprising:

a first pressurized gas cooler positioned to receive a first stream of pressurized gas from a pressurized gas storage unit or a compressor to cool the first stream of the pressurized gas to a pre-selected fueling temperature;

the first pressurized gas cooler positioned to receive a first portion of heat transfer fluid from a heat transfer fluid storage unit for cooling of the first stream of the pressurized gas;

the first pressurized gas cooler connected to an output conduit to output the first stream of the pressurized gas at the pre-selected fueling temperature for feeding to at least one first vehicle for fueling of the at least one first vehicle;

a controller having a processor connected to a non-transitory memory, the controller communicatively connected to a temperature sensor of the first pressurized gas cooler to receive temperature data from the temperature sensor for adjusting a flow of the first portion of the heat transfer fluid to the first pressurized gas cooler;

a second pressurized gas cooler positioned to receive a second stream of pressurized gas from the pressurized gas storage unit or the compressor to cool the second stream of the pressurized gas to the pre-selected fueling temperature;

the second pressurized gas cooler positioned to receive a second portion of heat transfer fluid from the heat transfer fluid storage unit for cooling of the second stream of the pressurized gas;

the second pressurized gas cooler connected to an output conduit to output the second stream of the pressurized gas at the pre-selected fueling temperature for feeding to at least one second vehicle for fueling of the at least one second vehicle;

the controller communicatively connected to a temperature sensor of the second pressurized gas cooler to receive temperature data from the temperature sensor for adjusting a flow of the second portion of the heat transfer fluid to the second pressurized gas cooler;

the heat transfer fluid storage unit;

a heat transfer fluid pump positioned between the heat transfer fluid storage unit and the first pressurized gas cooler for receiving heat transfer fluid from the heat transfer fluid storage unit for feeding the first portion of the heat transfer fluid to the first pressurized gas cooler and the second portion of the heat transfer fluid to the second pressurized gas cooler;

the controller communicatively connectable to the heat transfer fluid pump to adjust operation of the heat transfer fluid pump;

a heat transfer fluid cooler positioned to receive heat transfer fluid from the heat transfer fluid storage unit for cooling the heat transfer fluid; and the heat transfer fluid cooler positioned to receive a refrigerant or a heat sink fluid from a heat sink source for cooling of the heat transfer fluid.

* * * * *